United States Patent [19]

Buma et al.

[11] Patent Number: 4,869,528

[45] Date of Patent: Sep. 26, 1989

[54] ELECTRONICALLY CONTROLLED FLUID SUSPENSION SYSTEM

[75] Inventors: Shuuichi Buma; Nobutaka Ohwa, both of Toyota; Osamu Takeda, Susono; Toshio Aburaya, Toyota, all of Japan

[73] Assignee: Toyota Jidosha Kabushiki Kaisha, Japan

[21] Appl. No.: 192,297

[22] Filed: May 10, 1988

[30] Foreign Application Priority Data

| May 12, 1987 | [JP] | Japan | 62-70544[U] |
| May 15, 1987 | [JP] | Japan | 62-73453[U] |
| Jan. 22, 1988 | [JP] | Japan | 63-7503[U] |
| Jan. 22, 1988 | [JP] | Japan | 63-7504[U] |

[51] Int. Cl.$^4$ ............................................. B60G 11/26
[52] U.S. Cl. ................................. 280/707; 280/708; 280/772; 280/DIG. 1; 280/840
[58] Field of Search ............... 280/6 R, 707, 708, 711, 280/772, DIG. 1

[56] References Cited

U.S. PATENT DOCUMENTS

| 4,621,833 | 11/1986 | Soltis | 280/707 |
| 4,624,476 | 11/1986 | Tanaka et al. | 280/707 |
| 4,647,069 | 3/1987 | Iijima | 280/707 |
| 4,652,010 | 3/1987 | Sugasawa | 280/707 |
| 4,673,194 | 6/1987 | Sugasawa | 280/707 |

FOREIGN PATENT DOCUMENTS

| 60-119608 | 8/1985 | Japan . |
| 60-119621 | 8/1985 | Japan . |
| 60-152510 | 10/1985 | Japan . |

Primary Examiner—Kenneth R. Rice
Attorney, Agent, or Firm—Parkhurst, Oliff & Berridge

[57] ABSTRACT

An electronically controlled fluid suspension system for preventing the lateral roll of a vehicle computes a predetermined estimated lateral acceleration based on the running speed and the difference between the maximum steering angle and the minimum steering angle within a predetermined period. The supply and discharge of the air to and from the air springs is rapidly controlled corresponding to the estimated lateral acceleration so as to prevent the vehicle from rolling due to the steering operation. Moreover, the electronically controlled fluid suspension system computes a predetermined target vehicle height based on the lateral acceleration. After the air is supplied and discharged to and from the air springs and the increase of the lateral acceleration is stopped, the vehicle height is restored regardless of the external disturbance, by controlling the supply and discharge of the air corresponding to the vehicle height difference between the target vehicle height and the actual vehicle height.

11 Claims, 23 Drawing Sheets

FRONT-WHEEL SIDE HIGH PRESSURE RESERVE TANK

FRONT-WHEEL SIDE LOW PRESSURE
RESERVE TANK

FRONT-WHEEL SIDE HIGH PRESSURE RESERVE TANK

PRESSURE PFH IN FRONT-WHEEL SIDE HIGH PRESSURE RESERVE TANK / PRESSURE P4FL or P4FR IN MAIN AIR CHAMBER

FRONT-WHEEL SIDE LOW PRESSURE RESERVE TANK

PRESSURE P4FL or P4FR IN MAIN AIR CHAMBER / PRESSURE PFL IN FRONT-WHEEL SIDE LOW PRESSURE RESERVE TANK

ELECTRONICALLY CONTROLLED FLUID SUSPENSION SYSTEM

BACKGROUND OF THE INVENTION

This invention relates to an electronically controlled fluid suspension system for preventing a vehicle from laterally rolling.

In order to enhance riding comfort and steering stability, various suspension systems have been proposed. For example, in a system disclosed in Japan published unexamined utility model application No. 60-152510, the normal cornering and the rapid cornering of the vehicle—depending on rapidity of steering—are detected distinctively from each other by determining whether or not the steering angle speed is not less than a standard value. If the normal cornering is thus detected, the compressed air is supplied by a reduced amount and the vehicle attitude is controlled in a relatively gradual manner according to the controlling time period calculated by a map representing a relation between a steering angle and a vehicle speed. If rapid cornering is detected, on the other hand, the compressed air is supplied by an increased amount so as to control the vehicle attitude rapidly according to the aforementioned map.

Yet, this prior art electronically controlled suspension system has some problems. Specifically, in such a system that detects the steering angle and the steering speed, the actuators and other devices are controlled to be actuated corresponding to the values of steering angle or speed which are detected every moment. As a result, the actuators and other devices are operated rather frequently, thus causing a problem in realizing an immediate response of the actuators and other devices. If actuation is controlled according to the average of the detected values of the steering speed, etc., the above problem as to the operational frequency and responsiveness may be solved. However, in case of a rapid steering immediately followed by a reverse rapid steering, the average value becomes small, resulting in that the vehicle attitude is controlled not rapidly but gradually. Therefore, the control of the vehicle attitude is occasionally delayed.

There are other prior arts which control the damping force of a shock absorber or the spring constant of an air spring. For example, in a system disclosed in Japan published unexamined utility model application No. 60-119608, the damping force of the shock absorber and the spring constant of the air spring are controlled upon detection of a predetermined lateral acceleration so as to prevent rolling, thus keeping the vehicle body horizontal. In another system disclosed in Japan published unexamined utility model application No. 60-119621, the spring constant of the air spring is controlled based on the steering angle speed of the steering wheel and the vehicle speed. Corresponding to the steering angle speed or the lateral acceleration detected at the beginning of cornering, these prior art electronic controlled suspension systems predict the subsequent roll of the vehicle body and control the spring constant. In this case, the predicted roll is occasionally different from the actual roll because of the external disturbance such as different frictional coefficients on an uneven road surface or a cross wind. Therefore, the aforementioned prior art suspension systems cannot satisfactorily improve riding comfort or steering stability.

SUMMARY OF THE INVENTION

It is accordingly an object of the present invention to provide an electronically controlled fluid suspension system for controlling the vehicle attitude according to the variable steering angle and for realizing rapid response. It is another object of the present invention to provide an electronically controlled fluid suspension system for fully enhancing riding comfort and steering stability regardless of the external disturbance.

These objects are attained by fluid suspension system comprising: a fluid suspension connected to a wheel M1 of a vehicle and having a fluid spring M2 and a reserve tank M3; fluid supply/release means M4 connected to both the fluid spring and the reserve tank for making and blocking communication therebetween; steering angle detection means M5 for detecting a steering angle; vehicle speed detection means M6 for detecting a vehicle speed; steering angle difference detection means M7 for computing a steering angle difference between a maximum steering angle and a minimum steering angle detected within a predetermined time period; estimated acceleration calculation means M8 for computing an estimated lateral acceleration in response to the detected steering angle difference and the detected vehicle speed; and supply/release control means M9 for computing a controlled variable for the fluid supply/release means in response to the estimated lateral acceleration and for controlling the fluid supply/release means in response to the controlled variable so as to control a vehicle height and prevent the vehicle from rolling.

The objects are also attained by a fluid suspension system comprising: a fluid suspension connected to a wheel M1 of a vehicle and having a fluid spring M2 and a reserve tank M3; fluid supply/release means M4 connected to both the fluid spring and the reserve tank for making and blocking communication therebetween; steering angle detection means for detecting a steering angle of the vehicle; vehicle attitude control means M14 for controlling the fluid supply/release means in response to the detected steering angle; vehicle height detection means M16 for detecting a vehicle height; lateral acceleration detection means M17 for detecting a lateral acceleration of the vehicle; vehicle height difference computation M18 means for computing a predetermined vehicle height in response to the detected lateral acceleration and computing a vehicle height difference between the computed vehicle height and the detected vehicle height; and vehicle height compensation means M19 for controlling the fluid supply/release means in response to the computed vehicle height difference when the lateral acceleration stops increasing as a result of operation of the fluid supply/release means controlled by the vehicle attitude control means, thereby controlling the vehicle height and preventing the vehicle from rolling.

BRIEF DESCRIPTION OF THE DRAWINGS

The invention may be best understood by reference to the following description of preferred embodiments and the drawings in which.

DETAILED DESCRIPTION OF PREFERRED EMBODIMENTS

Figure 2:
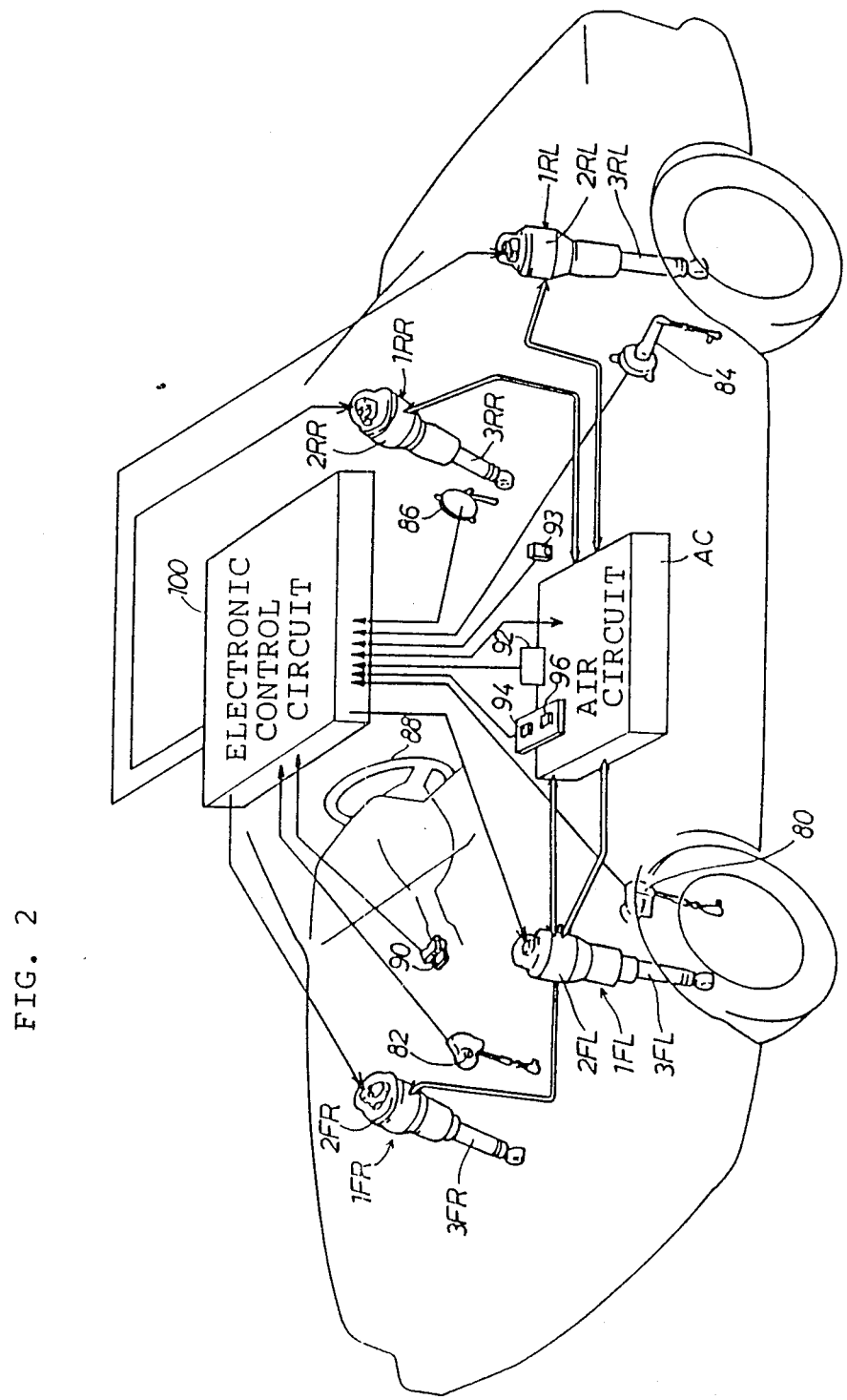
FIG. 2 is a schematic view of an electronic controlled suspension system according to the first and a second embodiments of the present invention.
Figure 3:
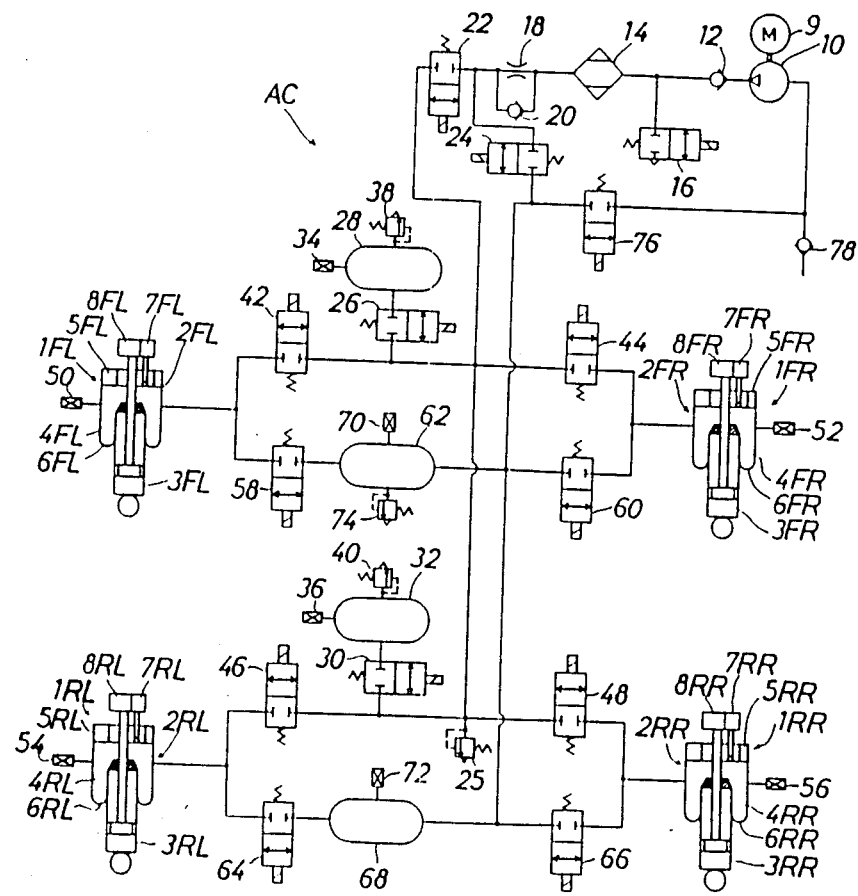
FIG. 3 is an air circuit diagram of the present embodiments.

As shown in FIGS. 2 and 3, the electronic controlled gas suspension system of the present invention is equipped with a front-wheel lefthand suspension 1FL, a front-wheel righthand suspension 1FR, a rear-wheel lefthand suspension 1RL and a rear-wheel righthand suspension 1RR, all of which are connected to an air circuit AC. These suspensions 1FL, 1FR, 1RL and 1RR are equipped with air springs 2FL, 2FR, 2RL and 2RR and shock absorbers 3FL, 3FR, 3RL and 3RR, respectively. The air springs 2FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 5RL and 6RR so that the height of the vehicle can be changed by supplying and discharging air to and from the main air chambers 4FL, 4FR, 4RL and 4RR. The air springs 2FL, 2FR, 2RL and 2RR can have their spring constants changed to "low", "medium" and "high" steps by energizing spring motors 7FL, 7FR, 7RL and 7RR to either provide/block communications between the main air chambers 4FL, 4FR, 4RL and 4RR and the auxiliary air chambers 5FL, 5FR, 5RL and 5RR or switch the air flow rates. The shock absorbers 3FL, 3FR, 3RL and 3RR can have their damping force changed to "low", "medium" and "high" by energizing absorber motors 8FL, 8FR, 8RL and 8RR to control the flow rate of working oil passing through orifices (not shown).

On the other hand, the air circuit AC is equipped with a compressor 10 which is driven by a motor 9 so that it may act as a compressed air supply source for the air springs 2FL, 2FR, 2RL and 2RR. The compressor 10 has its discharge side connected to an air drier 14 and a main discharge valve 16 through a check valve 12 for preventing any back flow. Silica gel is provided in the air drier 14 to remove moisture from the compressed air. This air drier 14 is connected to the respective one side of a supply valve 22 and a connection valve 24 through a fixed throttle 18 and a check valve 20 for preventing any back flow. The other side of the supply valve 22 is connected to a relief valve 25 set at a predetermined pressure, and through a high pressure reservoir valve 26 to a front-wheel side high pressure reserve tank 28, and through another high pressure reservoir valve 30 to a rear-wheel side high pressure reserve tank 32. These high pressure reserve tanks 28 and 32 are respectively equipped with pressure sensors 34 and 36 for detecting the air pressures in the high pressure reserve tanks 28 and 32 and relief valves 38 and 40 set at a predetermined pressure.

The above-mentioned side of the supply valve 22 is connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. To these main air chambers 4FL, 4FR 4RL and 4RR, respectively, there are connected pressure sensors 50, 52, 54 and 56 for detecting the air pressures.

The main air chamber 4FL at the front-wheel lefthand side and the main air chamber 4FR at the front-wheel righthand side are connected to a low pressure reserve tank 62 at the front wheel side, respectively, through a discharge valve 58 and a similar discharge valve 60. Moreover, the main air chamber 4RL at the rear-wheel lefthand side and the main air chamber 4RR at the rear-wheel righthand side are connected to a low pressure reserve tank 68 at the rear wheel side, respectively, through a discharge valve 64 and a similar discharge valve 66. On the other hand, the front-wheel side low pressure reserve tank 62 and the rear-wheel side low pressure reserve tank 68 are connected to have communication at all times. To these low pressure reserve tanks 62 and 68, respectively, there are connected pressure sensors 70 and 72 for detecting the air pressures in the reserve tanks 62 and 68. To the front-wheel side low pressure reserve tank 62, there is connected to a relief valve 74 which is set at a predetermined pressure.

These two low pressure reserve tanks 62 and 68 are connected to the other side of the aforementioned connection valve 24 and further to the suction side of the compressor 10 through a suction valve 76. To the suction side of the compressor 10, there is connected a check valve 78 for intaking external air. It may be possible to construct the air circuit AC as a closed circuit without the check valve 78 and to fill the air circuit AC with air or other gas, e.g., nitrogen gas.

The aforementioned discharge valve 16, supply valve 22, connection valve 24, high pressure reservoir valves 26 and 30, leveling valves 42, 44, 46 and 48, discharge valves 58, 60, 64 and 66, and suction valve 76 are of the normally closed two-position type in the present embodiments.

The present air circuit AC is equipped at its front wheel side and rear wheel side with the high pressure reserve tanks 28 and 32 and the low pressure reserve tanks 62 and 68. The front wheel side and rear wheel side may be provided in common with a high pressure reserve tank and a low pressure reserve tank.

As shown in FIG. 2, in the suspension system of the present invention, there are provided: a height sensor 80 for detecting the distance between the lefthand front wheel and the vehicle body, i.e., the lefthand front height; a height sensor 82 for detecting the righthand front height; a height sensor 84 for detecting the lefthand rear height; and a height sensor 86 for detecting the righthand rear height. Each of these height sensors 80, 82, 84, and 86 outputs a signal corresponding to a positive height difference when the detected height is greater than a predetermined standard height, and outputs a signal corresponding to a negative height difference when the detected height is less than the standard height. There are also provided: a steering angle sensor 90 for detecting the steering angle and direction of a steering wheel 88; and acceleration sensor 92 for detecting the acceleration of the vehicle body; and a speed sensor 93 for detecting the vehicular operating speed based on the revolution speed of the output shaft of the transmission (not shown). Also provided are high and low level switches 94 and 96 which are manually operated to instruct the vehicle height.

Figure 1:
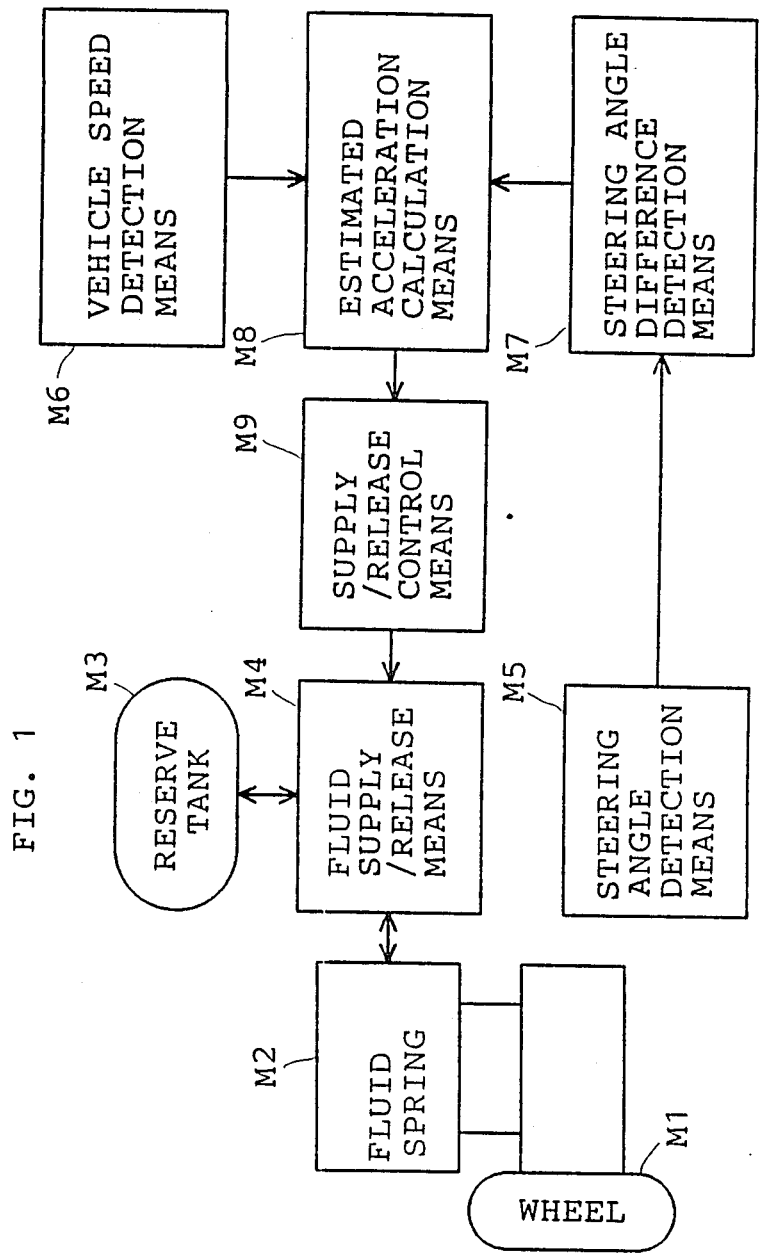
FIG. 1 is a block diagram showing a fundamental structure of a first embodiment of the present invention.

With reference to FIG. 1, the aforementioned steering angle sensor 90, the speed sensor 93, and the air circuit AC constitute steering angle detection means M5, vehicle speed detection means M6, and gas supply/release means M9, respectively.

Figure 4:
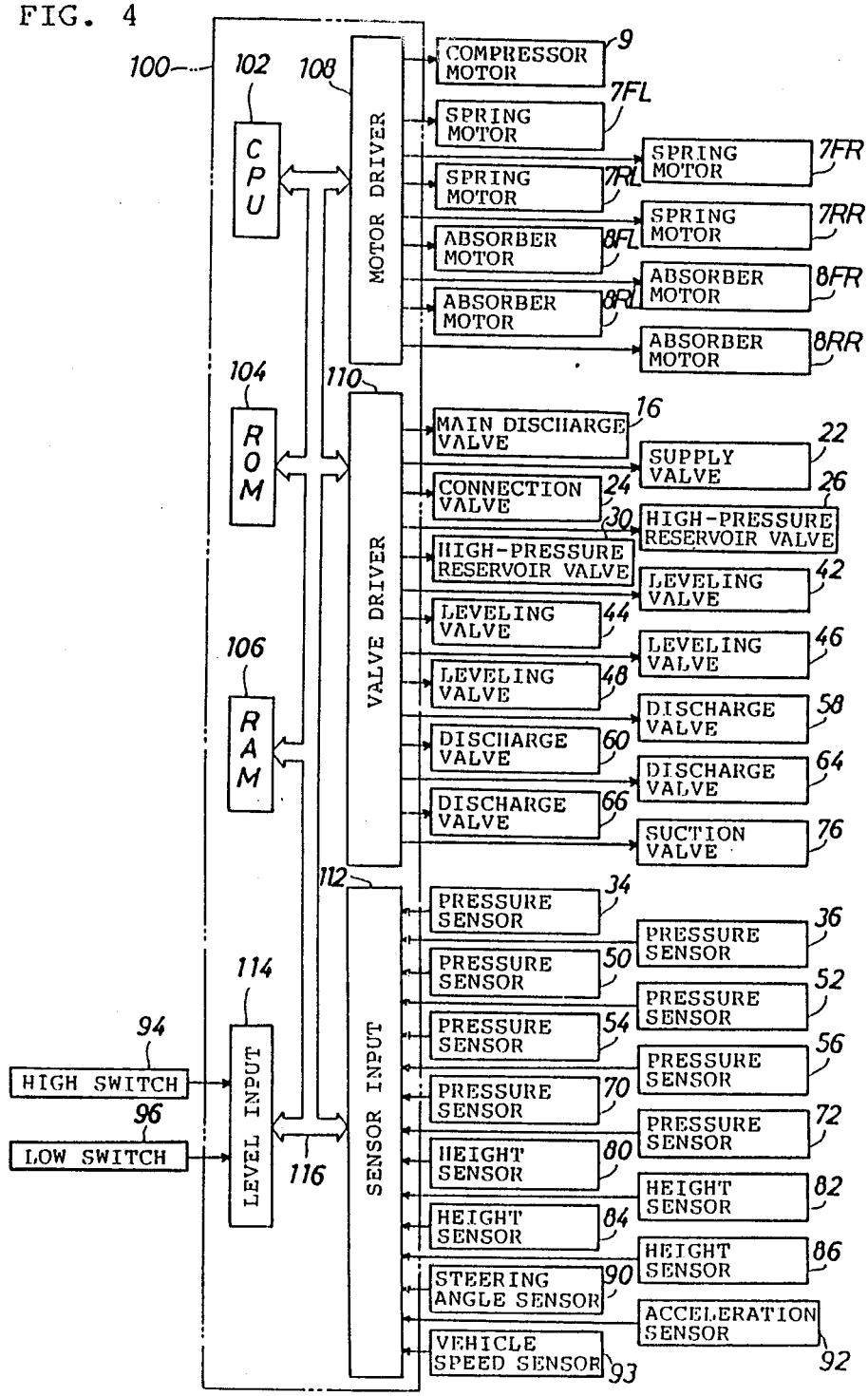
FIG. 4 is a block diagram indicating the construction of an electric system according to the present embodiments.

The electrical system of the present invention will be described with reference to the block diagram shown in FIG. 4. The aforementioned individual air suspensions 1FL, 1FR, 1RL and 1RR are driven and controlled by an electronic control circuit 100 to control the attitude of the vehicle. This electronic control circuit 100 includes, as shown in FIG. 4, known CPU 102, ROM 104 and RAM 106, as its logical arithmetic circuit. These CPU 102, ROM 104 and RAM 106 are mutually connected with input/output circuits, such as a motor driver 108, a valve driver 110, a sensor input circuit 112 and a level input circuit 114 by way of a common bus 116.

The CPU 102 receives the signals of the pressure sensors 34, 36, 50, 52, 54, 56, 70 and 72, the height sensors 80, 82, 84 and 86, the steering angle sensor 90, the acceleration sensor 92 and the speed sensor 93 by way of the sensor input circuit 112, and receives the signals of the high and low level switches 94 and 96 by way of the level input circuit 114. In response to these signals and the data in the ROM 104 and the RAM 106, on the other hand, the CPU 102 controls the individual air suspensions 1FL, 1FR, 1RL and 1RR by outputting drive signals to the compressor motor 9, the spring motors 7FL, 7FR, 7RL and 7RR and the absorber motors 8FL, 8FR, 8RL and 8RR through the motor driver 108 and by outputting drive signals to the discharge valve 16, the supply valve 22, the connection valve 24, the high pressure reservoir valves 26 and 30, the leveling valves 42, 44, 46 and 48, the discharge valves 58, 60, 64 and 66 and the suction valve 76 through the valve driver 110.

Figure 10:
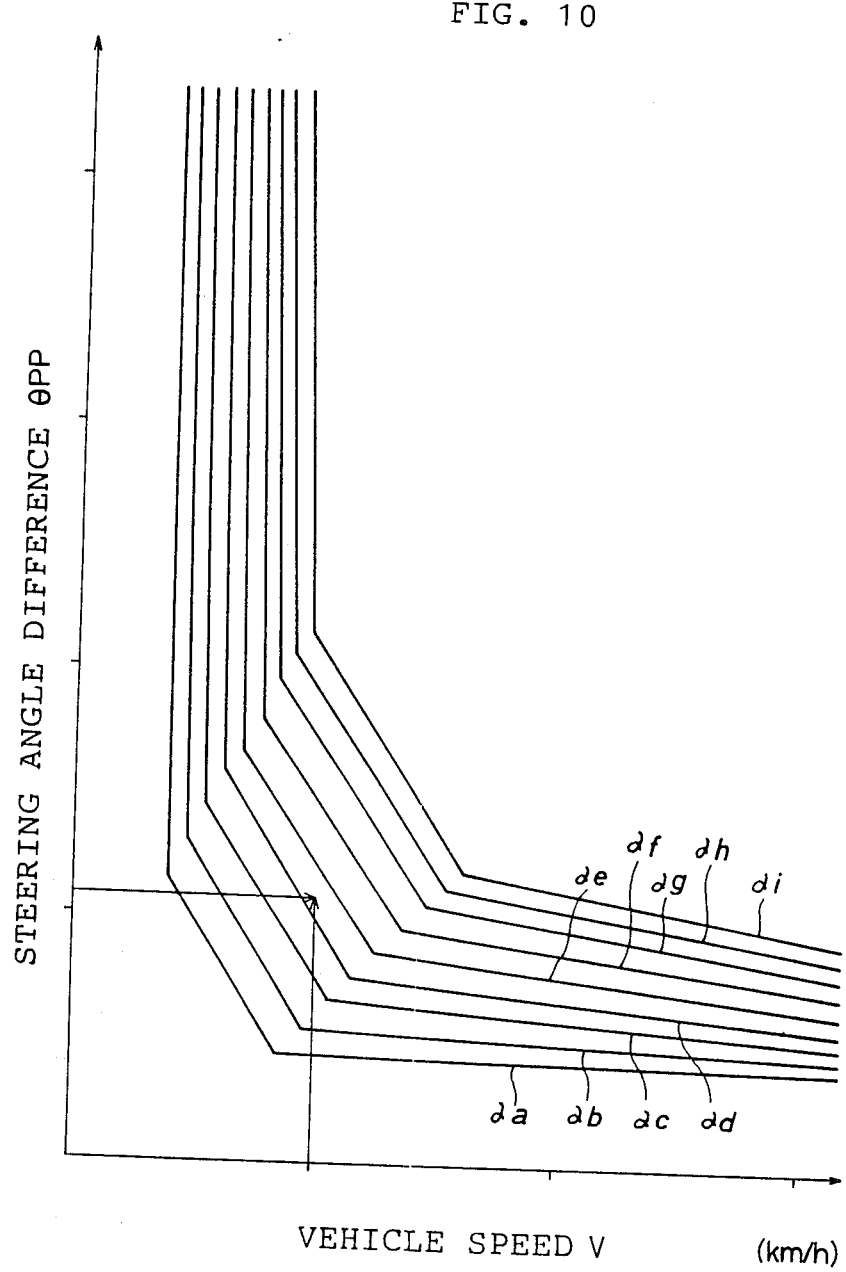
FIG. 10 is a graph showing a relation between a steering angle difference and a vehicle speed with an acceleration as a parameter.
Figure 11:
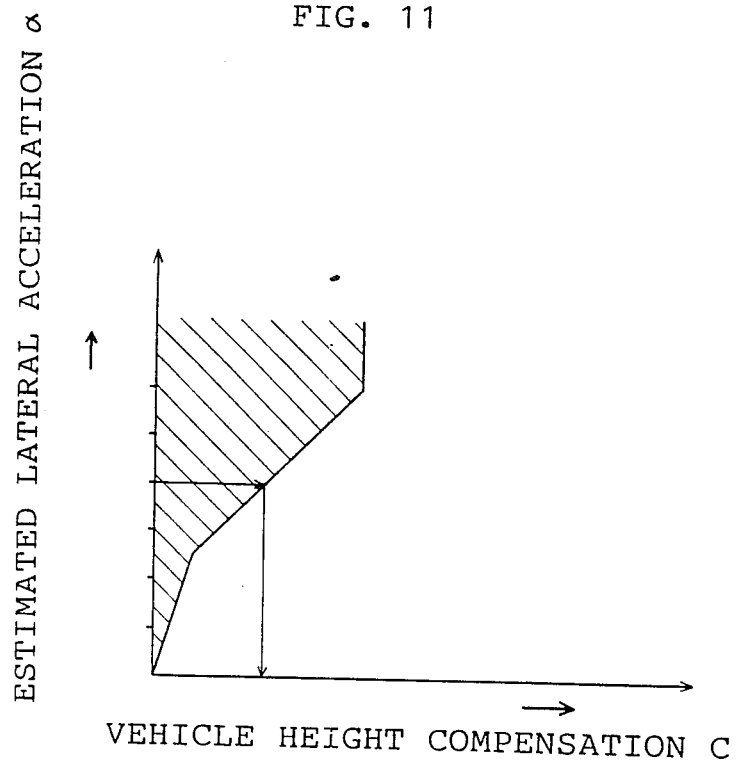
FIG. 11 is a graph showing a relation between an estimated lateral acceleration and a vehicle height compensation.
Figure 12:
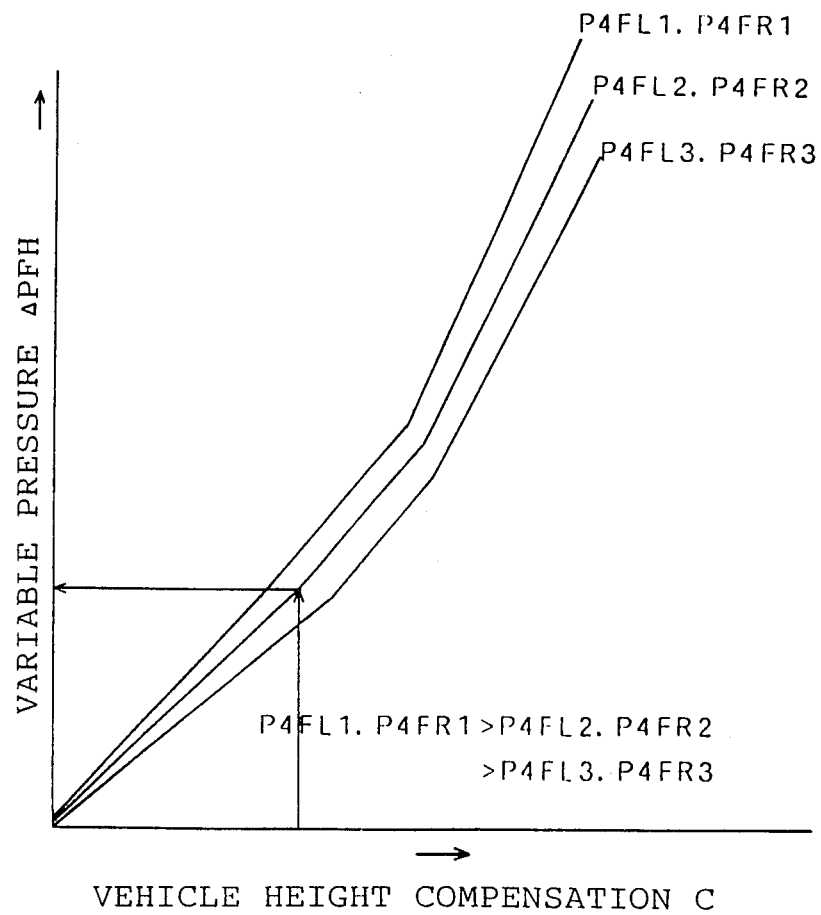
FIG. 12 is a graph showing a relation between a pressure and a vehicle height compensation.
Figure 13:
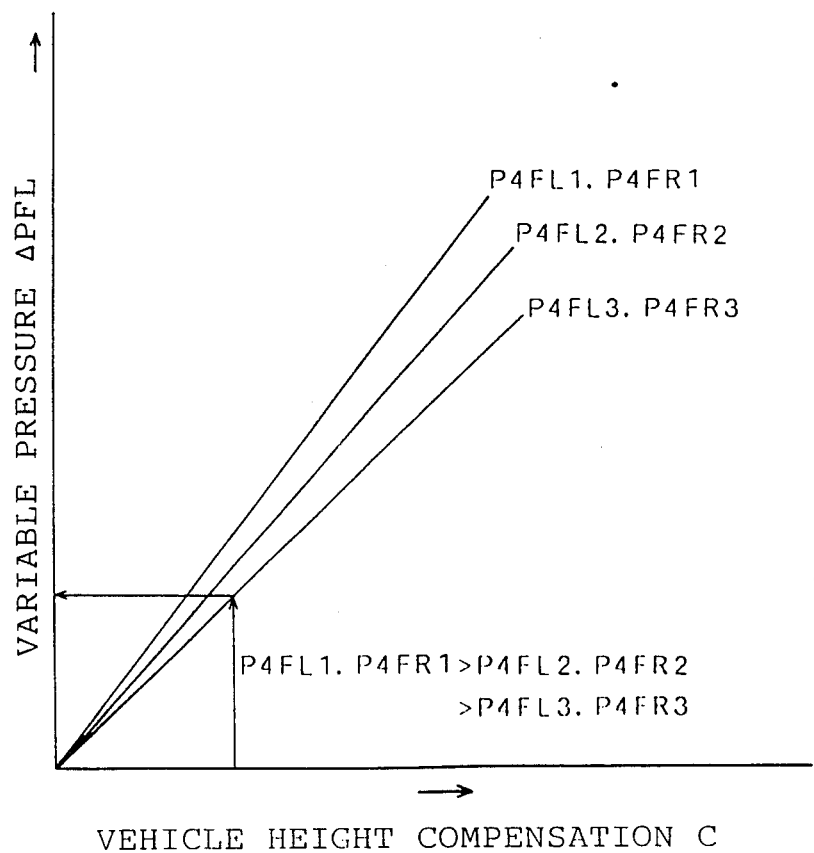
FIG. 13 is a graph showing a relation between a pressure and a vehicle height compensation.
Figure 14:
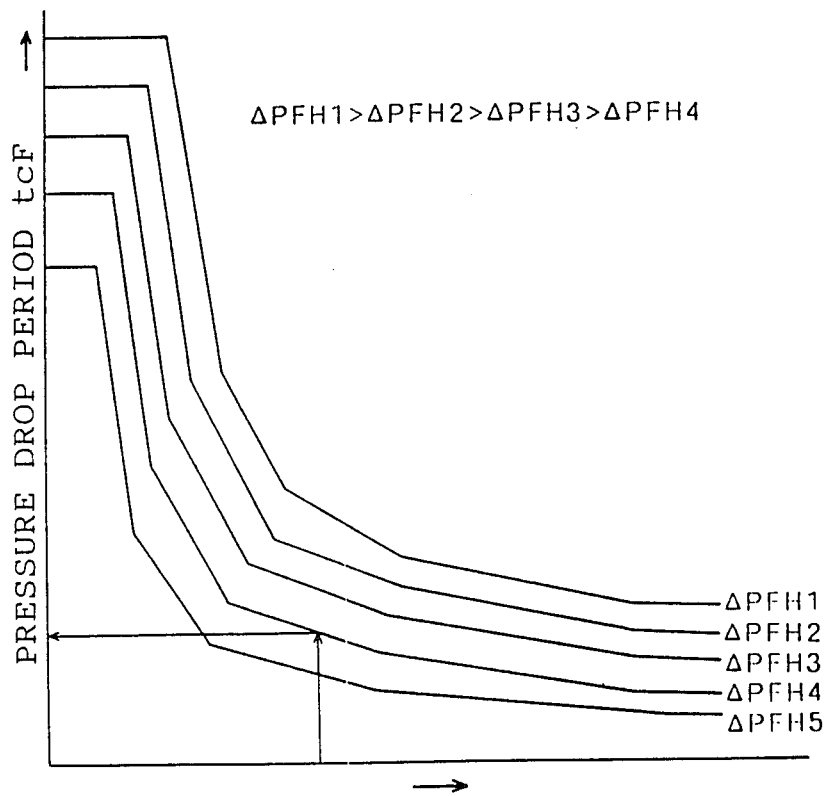
FIG. 14 is a graph showing a relation between a pressure drop period and a ratio of a pressure in high pressure reserve tanks to a pressure in main chambers.
Figure 15:
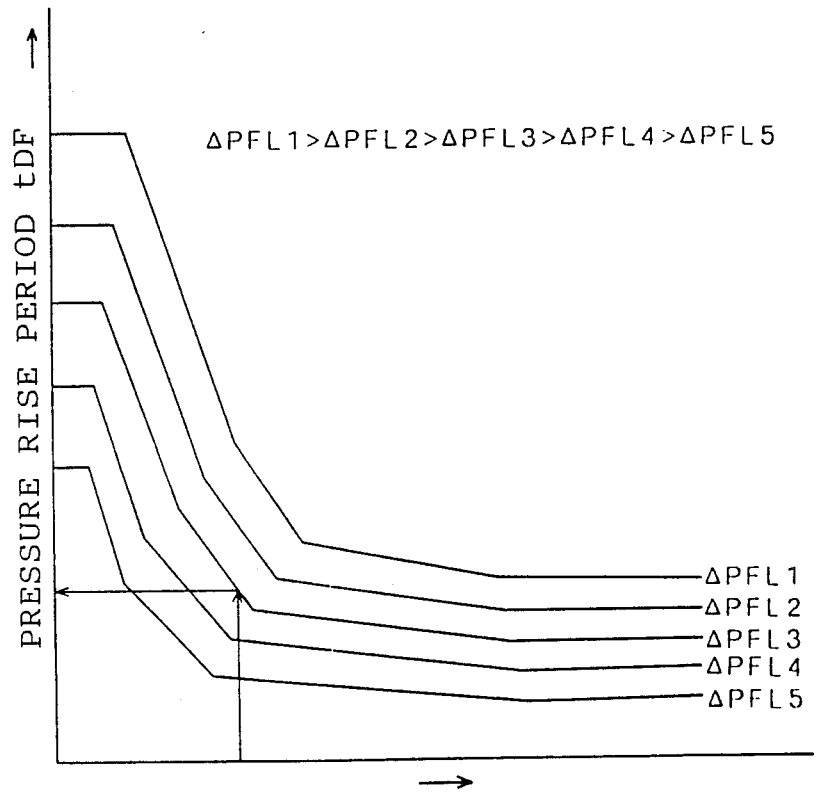
FIG. 15 is a graph showing a relation between a pressure rise period and a ratio of a pressure in main chambers to a pressure in low pressure reserve tanks.
Figure 16:
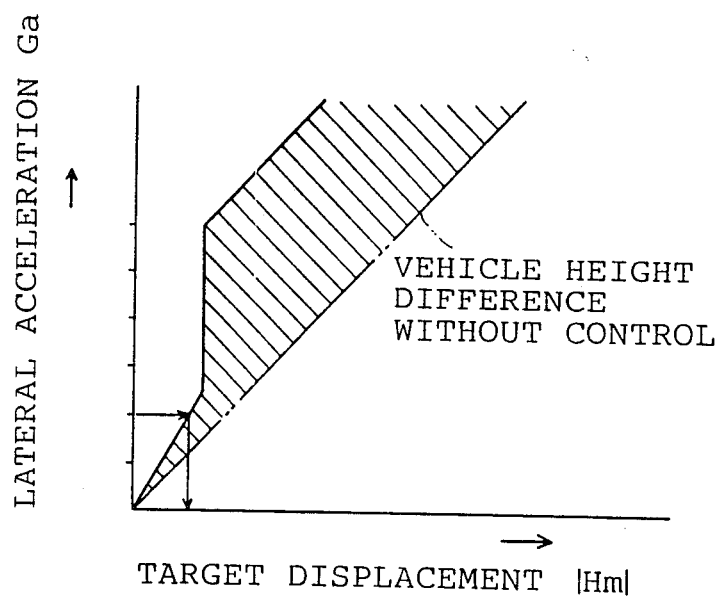
FIG. 16 is a graph showing a relation between a lateral acceleration and a target displacement.
Figure 17:
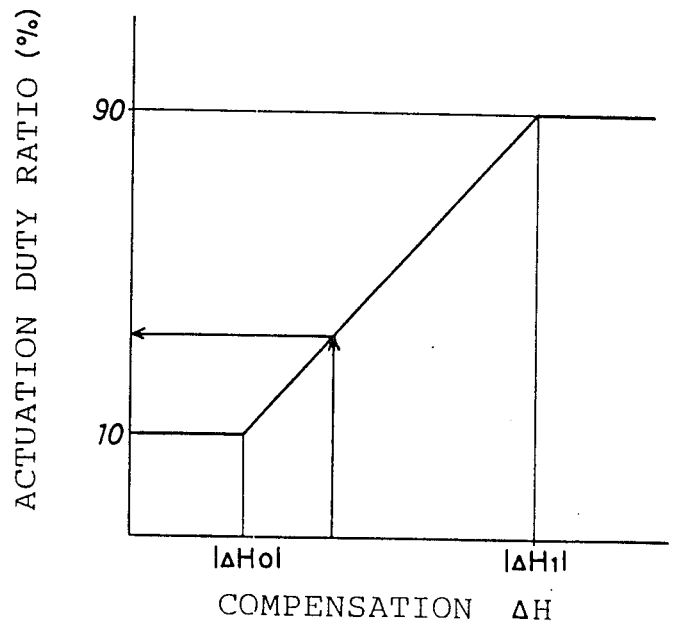
FIG. 17 is a graph showing an actuation duty ratio and a compensation.

The ROM 104 stores various maps, namely: MAP-a corresponding to a graph shown in FIG. 10; MAP-b corresponding to FIG. 11; MAP-c corresponding to FIG. 12; MAP-d corresponding to FIG. 13; MAP-e corresponding to FIG. 14; MAP-f corresponding to FIG. 15; MAP-g corresponding to FIG. 16; and MAP-h corresponding to FIG. 17. Specifically, FIG. 10 for MAP-a shows a steering angle difference $\theta PP$ (explained later) on the ordinate axis; and a vehicle speed V on the abscissa axis, with a lateral acceleration of the vehicle as a parameter. FIG. 11 for MAP-b shows an estimated lateral acceleration $\alpha$ (explained later) on the ordinate axis; and a vehicle height compensation C on the abscissa axis which increases with the estimated lateral acceleration $\alpha$. FIG. 12 for MAP-c shows a variable pressure $\Delta PFH$ on the ordinate axis; and a vehicle height compensation C at the outer-wheel side of the cornering vehicle on the abscissa axis, with pressures P4FL and P4FR in the front-wheel side main air chambers 4FL and 4FR as a parameter. The pressures P4FL and P4FR change according to the load condition on the vehicle, and the variable pressure $\Delta PFH$ changes as the air flows out of the front-wheel side high pressure reserve tank 28 into the front-wheel side main air chambers 4FL and 4FR. FIG. 13 for MAP-d shows a variable pressure $\Delta PFL$ on the axis of ordinate; and a vehicle height compensation C at the inner-wheel side of the cornering vehicle on the axis of abscissa, with pressures P4FL and P4FR in the front-wheel side main air chambers 4FL and 4FR as a parameter. The variable pressure $\Delta PFL$ changes as the air flows into the front-wheel side low pressure reserve tank 62 from the front-wheel side main air chambers 4FL and 4FR. FIG. 14 for MAP-e shows a pressure drop time period tcF on the ordinate axis; and the ratio of the pressure PFH in the front-wheel side high pressure reserve tank to the pressure P4FL or P4FR in the main air chambers on the abscissa axis, with the variable pressure $\Delta PFH$ in the front-wheel side high pressure reserve tank as a parameter. The aforementioned pressure drop time period tcF is a necessary period for stepping down the pressure PFH in the high pressure reserve tank corresponding to the variable pressure $\Delta PFH$ when the compressed air is supplied into the front-wheel side main air chambers 4FL and 4FR. FIG. 15 for MAP-f shows a pressure rise time period tDF on the ordinate axis; and the ratio of the pressure P4FL or P4FR in the front-wheel side main air chambers to the pressure PFL in the front-wheel side low pressure reserve tank on the abscissa axis, with the variable pressure $\Delta PFL$ in the front-wheel side low pressure reserve tank as a parameter. The aforementioned pressure rise time period tDF is a necessary period for stepping up the pressure PFL in the low pressure reserve tank corresponding to the variable pressure $\Delta PFL$ when the air is discharged from the front-wheel side main air chamber 4FL or 4FR into the low pressure reserve tank 62. FIG. 16 for MAP-g shows a lateral acceleration Ga on the ordinate axis and an absolute value of a target displacement Hm on the abscissa axis. FIG. 17 for MAP-h shows a valve actuation duty ratio—explained later—on the ordinate axis and a compensation $\Delta H$ on the abscissa axis. In the present embodiments, the target displacement Hm shown by a hatched area in FIG. 16 corresponds to the vehicle height compensation C shown by a hatched area in FIG. 11.

The ROM 104 further stores some other maps, namely: MAP-i, MAP-j, MAP-k, and MAP-l. Similarly to FIG. 12, MAP-i shows a relation between a variable pressure $\Delta PRH$ in the rear-wheel side high pressure reserve tank 32 and a vehicle height compensation C for the outer-wheel side of the cornering vehicle. Similarly to FIG. 13, MAP-j shows a relation between a variable pressure ΔPRL in the rear-wheel side low pressure reserve tank 68 and a vehicle height compensation C for the inner-wheel side of the cornering vehicle. Similarly to FIG. 14, MAP-k shows a relation between a pressure drop time period tCR of the rear-wheel side high pressure reserve tank 32 and a ratio of the pressure P4RL or P4RR in the main air chamber to the pressure PRH in the rear-wheel side high pressure reserve tank. Similarly to FIG. 15, MAP-1 shows a relation between a pressure rise time period tDR of the rear-wheel side low pressure reserve tank 68 and a ratio of the pressure PRL in the rear-wheel side low pressure reserve tank to the pressure P4RL or P4RR in the main air chamber.

The processing procedures to be executed in the electronic control circuit 100 described above will be explained with reference to the flowchart of FIGS. 5A through 8.

When the key switch (not shown) is turned on, the electronically controlled air suspension system of the present invention executes a suspension control routine shown in FIGS. 5A through 8 as well as other control routines. First, data, flags and so on are initialized at step 200. At step 205, the signals from the pressure sensors 34, 36, 50, 52, 54, 56, 70 and 72, from the height sensors 80, 82, 84 and 86, from the steering angle sensor 90, from the acceleration sensor 92 and the speed sensor 93 are input through the sensor input circuit 112. At step 210, the state of the vehicle is computed based on the signals from the individual sensors. For example, a current steering angle $\theta n$ detected by the steering angle sensor 90 is sequentially input at intervals of a predetermined time period, e.g., 8 msec, and then an average steering angle $\bar{\theta}n$ is computed based on the sum of steering angles $\theta n$ detected within a predetermined time period, e.g., 256 msec, according to the following equation (1):

$$\bar{\theta}n = \left( \sum_{m=1}^{32} \theta m/32 + \bar{\theta}_{n-1} \right)/2$$

Furthermore, a current lateral acceleration Gan detected by the acceleration sensor 92 is sequentially input at intervals of a predetermined time period, e.g., 8 msec, and then an average lateral acceleration $\overline{Gan}$ is computed based on the sum of lateral accelerations Gan detected within a predetermined time period, e.g., 64 msec. Similarly, an average front-to-rear acceleration $\overline{Gbn}$ is computed based on the sum of front-to-rear acceleration Gbn detected within 32 msec. A current vehicle height Hn detected by the height sensors 80, 82, 84 and 86 is sequentially input at intervals of a predetermined time period, e.g., 8 msec, and then an average height $\overline{Hn}$ is computed based on the sum of the vehicle heights Hn detected within a predetermined time period, e.g., 32 msec.

After step 210 it is determined at step 215 whether or not a rapid control interruption flag (described later) is being set. If NO, it is determined at step 216 whether or not a predetermined time period t1 has elapsed on a timer which is set through processing procedures (described later). If the period t1 has already passed and it is determined at the subsequent step 217 that each damping force of the individual shock absorbers 3FL, 3FR, 3RL and 3RR has not been changed, the damping force is switched to a higher degree at step 218. If the damping force is "low", for example, it is changed to "medium" by energizing the absorber motors 8FL, 8FR, 8RL and 8RR. If the damping force is "medium", it is changed to "high". Under the condition that: the damping force is switched to a higher degree at step 218; or the predetermined period t1 has not elapsed at step 216; or the damping force has been already switched at step 217, the program proceeds to step 220 where it is determined whether a flag for comletion of a communication control (described later) is being set or reset. If it is determined at step 220 that the aforementioned flag is reset, the program proceeds to the subsequent step 230 where it is determined whether a flag for completion of one roll-control (described later) is being set or reset. If this flag for completion of one roll-control is being reset at step 230, it is determined at step 235 whether a roll control flag, which is set during the roll control as described later, is being set or reset. If the roll control flag is being reset, the program proceeds to step 240 and step 245. At step 240, it is determined whether or not: the current vehicle speed V, detected at step 210, is not less than a predetermined speed Va, e.g., 15 km/h; and an absolute value of the current front-to-rear acceleration Gb is less than a predetermined acceleration Gba, e.g., 0.3 g (g=gravitational acceleration). At step 245, it is determined whether or not an absolute value of the difference between the average steering angle $\bar{\theta}n$—calculated at step 210—and the steering angle $\theta n$—detected after the operation of the steering wheel 88—is equal to or greater than a predetermined steering angle $\theta a$, e.g., six degree as a dead zone. If the answers at steps 240 and 245 are both YES, the steering angle difference $\theta PPo$ immediately after the detected steering is computed at step 250.

More specifically, at step 250 the steering angle difference $\theta PPo$ is calculated in the following method. As shown in FIG. 9, a maximum $\theta MAX$ and a minimum $\theta MIN$ are obtained among a set of the steering angles $\theta$ which are detected at particular intervals of tb (e.g., 8 msec) by the steering angle sensor 90 within a predetermined period ta (e.g., 40 msec) immediately after the detection of steering at step 245. The difference of these maximum $\theta MAX$ and minimum $\theta MIN$ becomes steering angle difference $\theta PPo$. At the subsequent step 260, the steering direction, namely, the cornering direction of the vehicle is judged depending on whether the difference between the first steering angle and the last steering angle of the time period ta is positive or negative. Thereafter, based on the steering angle difference $\theta PPo$ calculated at step 250 and the current vehicle speed V, step 265 computes an estimated lateral acceleration $\alpha$ according to the graph in FIG. 10 showing the relation between a predetermined steering angle difference $\theta PP$ and the vehicle speed V with a lateral acceleration—caused after the steering—as a parameter.

At step 270 it is determined whether or not the estimated lateral acceleration $\alpha$ is not less than a predetermined lateral acceleration $\alpha 0$, e.g., 0.25 g, which is characteristic of the roll of the vehicle. If so, a vehicle height compensation C of the vehicle height H is computed at step 275. Specifically, according to the graph in FIG. 11, the vehicle height compensation C is obtained based on the estimated lateral acceleration $\alpha$ computed at step 265. The vehicle height compensation C corresponds to the lifting distance of the vehicle height as to the outer wheels of the cornering vehicle, and corresponds to the descending distance of the vehicle height as to the inner wheels thereof.

At step 280, based on the computed vehicle height compensation C, the variable pressures ΔPFH and ΔPRH in the high pressure reserve tanks 28 and 32 are computed so as to supply the air to each of the main air chambers 4FL, 4FR, 4RL and 4RR, and the variable pressures ΔPFL and ΔPRL in the low pressure reserve tanks 62 and 68 are also computed so as to absorb the air from each of the main air chambers 4FL, 4FR, 4RL, and 4RR. More particularly, the variable pressure ΔPFH in the front-wheel side high pressure reserve tank 28 varies as the tank 28 supplies the air corresponding to the vehicle height compensation C. According to MAP-c shown in FIG. 12, this variable pressure ΔPFH is computed based on the vehicle height compensation C and the pressure in the air spring at the outer wheels as the parameter, that is, the pressure P4FL in the main air chamber 4FL for the lefthand front wheel 88 is operated clockwise. The variable pressure ΔPRH in the rear-wheel side high pressure reserve tank 32 is similarly computed according to MAP-i. On the other hand, the variable pressure ΔPFL in the front-wheel side low pressure reserve tank 62 varies as the tank 62 absorbs the air corresponding to the vehicle height compensation C. According to MAP-d shown in FIG. 13, this variable pressure ΔPFL is computed based on the vehicle height compensation C and the pressure in the main chamber at the inner wheels as the parameter, that is, the pressure P4FR in the main air chamber 4FR for the righthand front wheel which corresponds to the inner wheel when the steering wheel 88 is operated clockwise. The variable pressure ΔPRL in the rear-wheel side low pressure reserve tank 68 is similarly computed according to MAP-j.

Based on the variable pressures ΔPFH, ΔPRH, ΔPFL and ΔPRL computed at step 280, a time period T is computed at step 285 for actuating each of the valves connecting the high pressure reserve tanks 28 and 32 or the low pressure reserve tanks 62 and 68 with the main air chambers 4FL, 4FR, 4RL and 4RR. As for the outer front wheel of the cornering vehicle, a pressure drop period tCF for the front-wheel side high pressure reserve tank 28 is computed according to MAP-e shown in FIG. 14. To elaborate, the period tCF is calculated based on the variable pressure ΔPFH as the parameter and the ratio of the pressure PFH in the high pressure reserve tank to the pressure P4FL or P4FR in the main air chamber. Then, based on this pressure drop period tCF, a valve actuation time period TCF is computed according to the following equation (2) considering a line resistance coefficient, valve coefficient, etc.:

$$TCR = A \times tCF + B \tag{2}$$

As for the inner front wheel of the cornering vehicle, a pressure rise period tDF for the front-wheel side low pressure reserve tank 62 is computed according to MAP-f shown in FIG. 15. More particularly, the period tDF is calculated based on the variable pressure ΔPFL as the parameter and the ratio of the pressure P4FL or P4FR in the main air chamber to the pressure PFL in the low pressure reserve tank. Then, based on this pressure rise period tDF, a valve actuation time period tDF is computed according to the following equation (3) considering line resistance coefficient, valve coefficient, etc.:

$$TDF = C \times tDF + D \tag{3}$$

In the same manner, a valve actuating time period TCR as for the outer rear wheel is computed based on MAP-k and the equation (2); and a valve actuating time period TDR as for the inner rear wheel is computed based on MAP-1 and the equation (3).

After the valve actuating time periods TCF, TCR, TDF and TDR are computed at step 285, step 286 sets the timer for the predetermined time period t1, e.g., 60 msec. which is used for the processing procedure at step 216. Then, at step 290 a roll control flag is set, which indicates that roll control is being executed, and at step 295 actuation is made on the high pressure reservoir valves 26 and 30; the leveling valves 42, 44, 46 and 48; the discharge valves 58, 60, 64 and 66 corresponding to the respective valve actuating time periods TCF, TCR, TDF and TDR. In case that the vehicle is cornering to the right, for example, these valves are simultaneously actuated in such a manner that: the high pressure reservoir valve 26 and the leveling valve 42 are actuated for the time period TCR computed for the outer front wheel; the high pressure reservoir valve 30 and the leveling valve 46 are actuated for the time period TCR computed for the outer rear wheel; the discharge valve 60 is actuated for the time period TDF computed for the inner front wheel; and the discharge valve 66 is actuated for the time period TDR computed for the inner rear wheel.

Figure 9A:
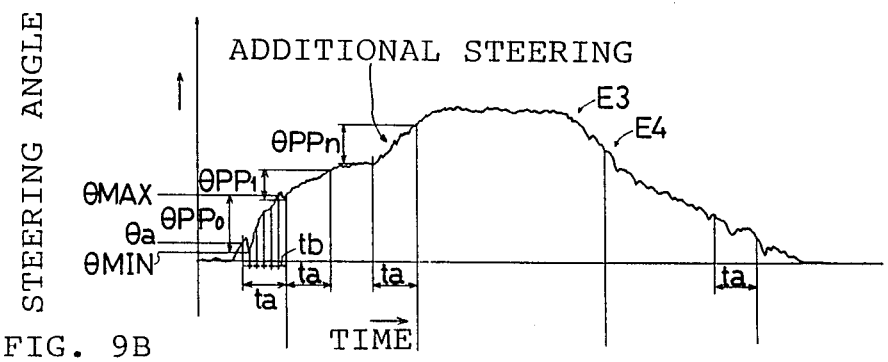
FIGS. 9A, 9B, 9C, 9D and 9E show relations between time and a steering angle, a lateral acceleration, control signals, and a vehicle height, respectively.
Figure 9B:
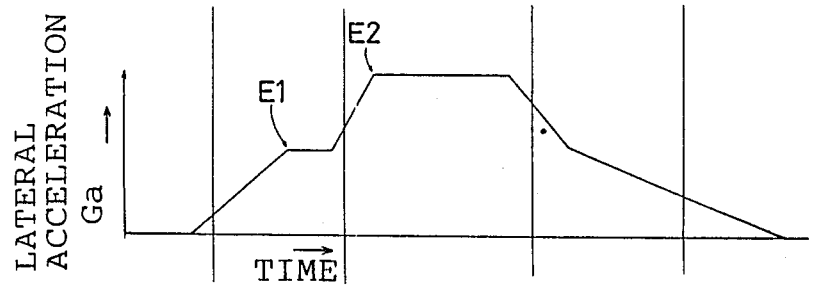
Figure 9C:
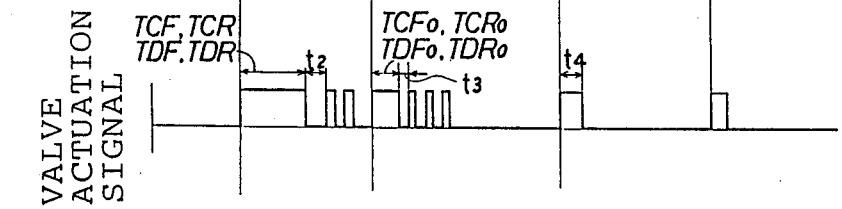
Figure 9D:
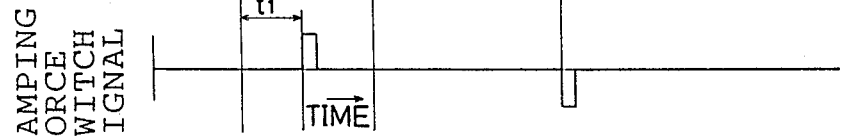
Figure 9E:
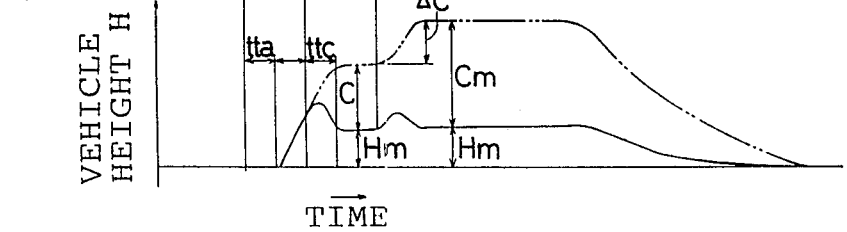

With reference to FIGS. 9A–9E, when the steering wheel 88 is operated, the lateral acceleration Ga starts to increase after a short time, and thereafter the vehicle height H starts to change as shown in a continuous line in FIG. 9E. When an actuation signal is output to the valves through the processing procedure at step 295, the valves start to operate after a predetermined delay time tta, e.g., 30 msec. As a result, the compressed air is rapidly supplied from the high pressure reserve tanks 28 and 32 to the main air chambers 4FL and 4RL at the outer-wheel side; and the air is rapidly discharged from the main air chambers 4FR and 4RR at the inner-wheel side to the low pressure reserve tanks 62 and 68. Thus, the supply and discharge of the air affects the vehicle height H after a particular short delay time ttb, e.g., 30 msec. The interrupted line in FIG. 9E indicates a change of the vehicle height H in case that the air is not supplied or discharged. In the present embodiments, the predetermined time period t1 is set at step 286 to be equal to the sum of the delay time tta and ttb (i.e., t1 = tta + ttb).

After step 295 and the subsequent steps which will be described later, the present control routine is repeatedly executed. At aforementioned steps 216 through 218, an actuation signal is output to each of the absorber motors 8FL, 8FR, 8RL and 8RR so as to switch the damping force of the respective shock absorbers 3FL, 3FR, 3RL and 3RR to a higher degree. Therefore, the damping force is switched in a determined delay time ttc, e.g., 45 msec, after the output of the actuation signal to each of the absorber motors 8FL, 8FR, 8RL and 8RR, as shown in FIGS. 9A–9E.

Alternatively, the target vehicle height control is executed at step 310 in case that: it is determined at step 215 that a rapid control interruption flag (described later) is being set; or it is determined at step 240 that the vehicle speed V is lower than a predetermined speed Va or that an absolute value of the front-to-rear acceleration Gb is equal to or greater than a predetermined acceleration Gba; or it is determined at step 245 that the steering angle θn is small; or it is determined at step 270 that the estimated lateral acceleration α is less than the predetermined lateral acceleration α0. The target vehicle height control at step 310 is carried out in the following manner. If the absolute value of the difference between the vehicle height H of each wheel detected by the height sensors 80, 82, 84 and 86 and the target vehicle height Hn during the normal straight forward driving is greater than a predetermined value ΔH, e.g., the minimum value of the controllable vehicle height, then the vehicle height H of each wheel is altered to the target vehicle height Hn by actuating the compressor 10 and the valves. More particularly, as for the wheel which is lower than the target vehicle height Hn, the compressor 10 is actuated together with the supply valve 22 and one of the leveling valves 42, 44, 46 and 48 corresponding to the wheel for which the vehicle height H is low, thereby supplying the compressed air to one of the main air chambers 4FL, 4FR, 4RL and 4RR corresponding to the wheel for which the vehicle height H is low. In this case, the amount of the supplied compressed air depends on the capacity of the compressor 10, the passage resistance, etc., and the vehicle height H gradually reaches the target vehicle height Hn. When the target vehicle height Hn is attained, the actuation for the compressor 10 and the valves 22, 42, 44, 46 and 48 is stopped.

As for the wheel which is higher than the target vehicle height Hn, the compressor 10 is not actuated, but the actuation is made for the discharge valve 16, the connection valve 24 and one of the discharge valves 58, 60, 64 and 66 corresponding to the wheel for which the vehicle height H is high. As a result, the air is released to the external air from one of the main air chambers 4FL, 4FR, 4RL and 4RR corresponding to the wheel for which the vehicle H is high. The amount of the released air depends on the throttle 18, the passage resistance, etc., and the vehicle height H gradually reaches the target vehicle height Hn. When the target vehicle height Hn is attained, the actuation for the valves 16, 24, 58, 60, 64 and 66 is stopped.

If the roll control flag is set at step 290, the answer at step 235 is YES and the present control routine is repeatedly executed until it is determined at step 315 that the valve actuation is completed according to the respective valve actuating periods TCF, TCR, TDF and TDR. If it is determined at step 315 that the valve actuation is completed, the roll control flag is cleared at step 335, and then a flag for completion of one roll-control is set at step 340, which indicates that the roll control has been completed.

If this flag for the completion of one roll-control is set at step 340, or if it is determined at step 230 that the flag for the completion of one roll-control is being set as a result of the repeated execution of the present control routine, the program proceeds to step 345 (shown in FIG. 6A) where it is determined whether or not the flag for the additional steering control—described later—is being set. If the flag for the additional steering control is not being set, the steering angle difference θPPn is computed at step 350 in the same method as computing the steering angle difference θPPo at step 250. To elaborate, as shown in FIG. 9A, the first steering angle difference θPP1 is obtained from the difference between the maximum θMAX and the minimum θMIN of the steering angles θ detected by the steering angle sensor 90 at intervals of the determined period tb within the determined period ta immediately after the calculation of the steering angle difference θPPo. In this method, the n-th steering angle difference θPPn is calculated for every determined period ta at step 350.

Then, at step 355 it is determined whether or not the steering angle difference θPPn is greater than the sum of the first steering angle difference θPP1 and the predetermined value k. If so, it means that the steering wheel 88 is additionally operated, which is called the additional steering. Then, at the subsequent step 360, the estimated lateral acceleration αn is computed, in the same manner as the computation at step 265, based on the current steering angle difference θPPn and the vehicle speed V according to the graph in FIG. 10. Then, based on this estimated lateral acceleration αn, the vehicle height compensation Cn for the additional steering is computed at step 365 according to FIG. 11 in the same manner as step 275. At step 370 it is determined whether or not the computed vehicle height compensation Cn is equal to or greater than the sum of the vehicle height compensation C—computed at step 275—and a predetermined value Ca, e.g., 13 mm. If so, the additional compensation ΔC (shown in FIG. 9) is computed at step 375 by subtracting the vehicle height compensation C, which has already been used for the compensation of the vehicle height at steps 250 through 295, from the vehicle height compensation Cn for the additional steering. Then, at step 380, based on this additional compensation ΔC, the variable pressures ΔPHF and ΔPRH in the high pressure reserve tanks 28 and 32 are computed for supplying the air to the main air chambers 4FL, 4FR, 4RL and 4RR; and the variable pressures ΔPFL and ΔPRL in the low pressure reserve tanks 62 and 68 are also computed for releasing the air from those main air chambers in the following manner. Similarly to step 280, the variable pressures ΔPFH and ΔPFL as for the front-wheel side are computed at step 380 according to FIGS. 12 and 13 and the variable pressures ΔPRH and ΔPRL as for the rear-wheel side are computed in the same manner as for the pressures ΔPFH and ΔPFL.

Similarly to step 285, the valve actuating periods for the additional steering is computed at the subsequent step 385 in the following manner. In accordance with FIGS. 14 and 15, the pressure drop periods tCF and tCR and the pressure rise periods tDF and tDR for each of the wheels are calculated based on the variable pressures ΔPFH, ΔPRH, ΔPFL and ΔPRL. Then, these calculated period tCF, tDR, tDF and tDR are substituted in the aforementioned equations (2) and (3), thereby obtaining the valve actuating periods TCF, TCR, TDF and TDR. Subsequently, these valve actuating periods TCF, TCR, TDF and TDR are multiplied by a predetermined coefficient K2 which is not greater than 1, thereby obtaining the valve actuating periods TCFo, TCRo, TDFo and TDRo for the additional steering for each wheel.

After the valve actuating periods TCFo, TCRo, TDFo and TDRo are computed at step 385, the flag for the additional steering control is set at step 390. Thereafter, similarly to step 295, actuation is made at step 400 on: the high pressure reservoir valves 26 and 30; the leveling valves 42, 44, 46 and 48; and the discharge valves 58, 60, 64 and 66. Specifically, if the vehicle is cornering to the right, the compressed air is rapidly supplied from the high pressure reserve tanks 28 and 32 to the main air chambers 4FL and 4RL at the outer-wheel side, and simultaneously the air is rapidly released from the main air chambers 4FR and 4RR at the inner-wheel side into the low pressure reserve tanks 62 and 68. When the valve actuation is started, the present control routine is repeatedly executed until it is determined at step 405 that the valve actuating periods TCRo, TCRo, TDFo and TDRo have elapsed. If those determined periods have passed, it means that the additional steering control has been completed, and at step 410 the flag for the additional steering control is cleared.

Figure 6A:
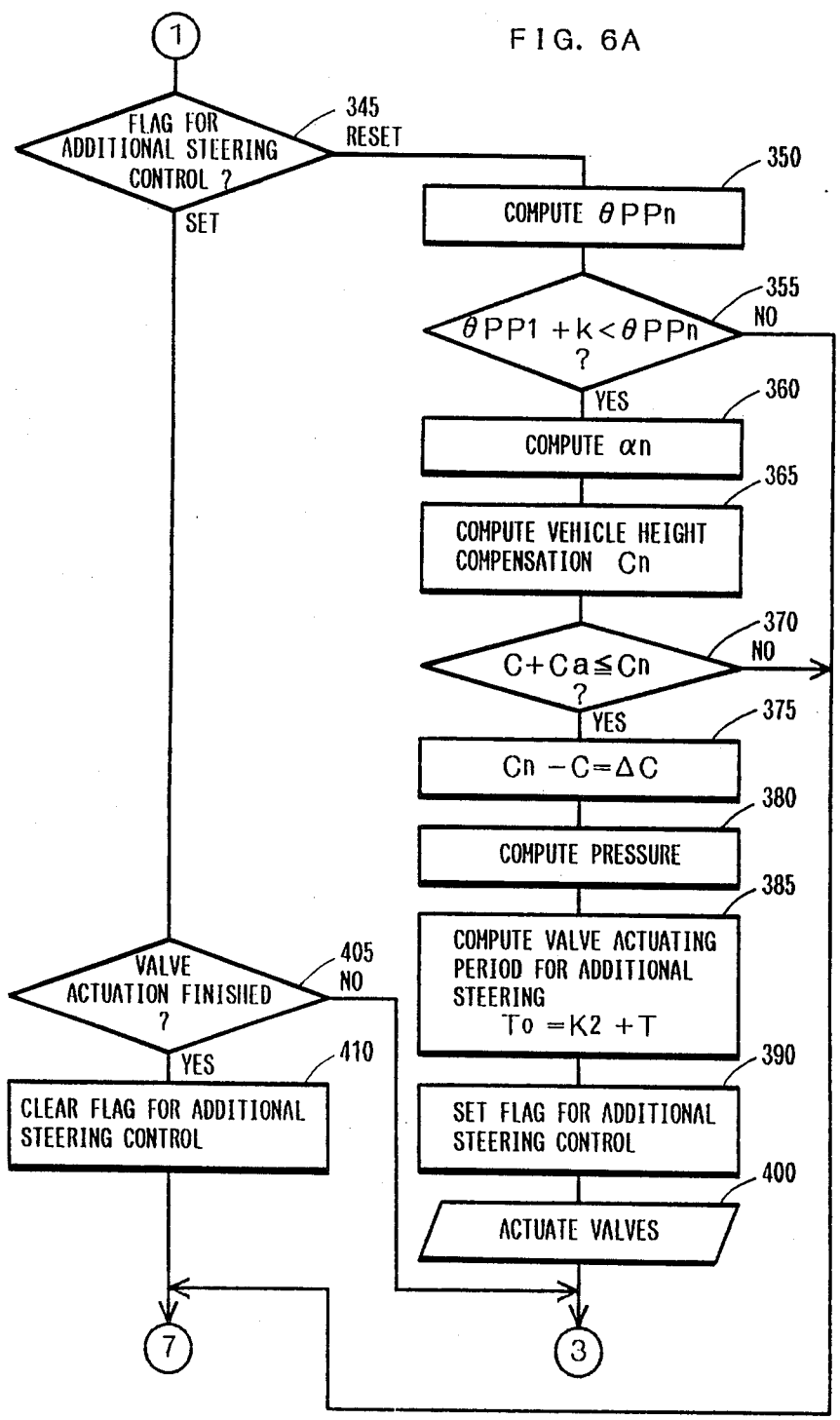
Figure 6B:
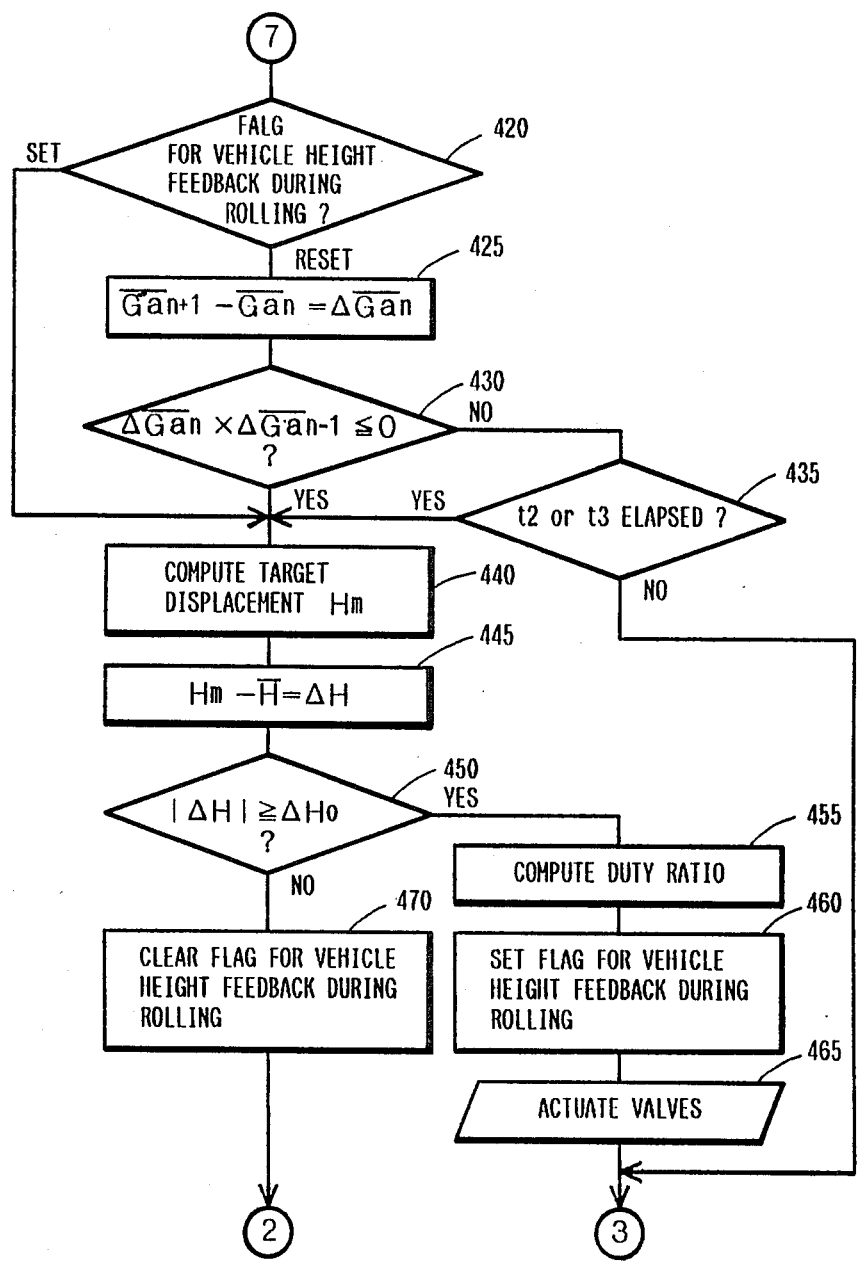

After the flag for the additional steering control is cleared at step 410; or after it is determined at step 355 that the steering angle difference $\theta PPn$ is equal to or less than the sum of the first steering angle $\theta PP1$ and the predetermined value k (namely, it is determined that additional steering control is not necessary), then, the program proceeds to step 420 shown in FIG. 6B where it is determined whether a flag for the vehicle height feedback during the roll—described later—is being set or reset. If the flag for the vehicle height feedback during the roll is being reset, an acceleration difference $\Delta \overline{Gan}$ is calculated at step 425 by subtracting $\overline{Gan}$ from $\overline{Gan}+1$ wherein: $\overline{Gan}+1$ is an updated average lateral acceleration detected by the acceleration sensor 92; and $\overline{Gan}$ is a previous average lateral acceleration.

After step 425, it is determined at step 430 whether or not a product of the updated acceleration difference $\Delta \overline{Gan}$ and the previous acceleration difference $\Delta \overline{Gan}-1$ ($=\overline{Gan}-\overline{Gan}-1$) is equal to or less than zero. If not, it is determined at step 435; whether a predetermined time period t2 has passed after the valve actuating periods TCF, TCR, TDF and TDR for actuating the valves at step 295; or whether a predetermined time period t3 has passed after the valve actuating periods TCFo, TCRo, TDFo and TDRo for actuating the valves in case of the additional steering at step 400. The present control routine is repeatedly executed until step 435 determines that the period t2 or t3 has passed.

If the answer at step 430 is YES, that is, if the product of the updated acceleration difference $\Delta \overline{Gan}$ and the previous acceleration difference $\Delta \overline{Gan}-1$ is equal to or less than zero, it means that the vehicle state has passed the inflection point E1 or E2 of the lateral acceleration Ga shown in FIG. 9B, and the program proceeds to step 440 where a target displacement Hm is computed. If it is determined at step 435 that the period t2 or t3 has passed, the program also proceeds to step 440 even when the vehicle state has not passed the inflection point E1 or E2 yet. In accordance with FIG. 16, the target displacement Hm is calculated based on the updated lateral acceleration Ga detected by the acceleration sensor 92, and its value becomes negative as for the outer wheels of the cornering vehicle and positive as for the inner wheels thereof.

After step 440, a compensation $\Delta H$ of each wheel is computed at step 445 in such a manner that an updated average vehicle height $\overline{H}$ of each wheel—detected by the respective vehicle height sensors 80, 82 84 and 86—is subtracted from the target displacement Hm (i.e., Hm$-\overline{H}=\Delta H$). If it is determined at the subsequent step 450 that the absolute value of the compensation $\Delta H$ is equal to or greater than a predetermined value $\Delta Ho$, e.g., 5 mm, the program proceeds to step 455 where a valve actuation duty ratio D is computed for actuating the valves once within a particular time period depending on the compensation $\Delta H$, according to FIG. 17. More particularly, a valve actuation duty ratio D is computed so as to actuate the high pressure reservoir valves 26 and 30 and the leveling valves 42, 44, 46 and 48 for supplying the compressed air from the high pressure reserve tanks 28 and 32 to one of the main air chambers 4FL, 4FR, 4RL and 4RR corresponding to the wheel for which the compensation $\Delta H$ value—computed at step 445—is negative. Alternatively, a valve actuation duty ratio D is computed so as to actuate the discharge valves 58, 60, 64 and 66 for releasing the air to the low pressure reserve tanks 62 and 68 from one of the main air chambers 4FL, 4FR, 4RL and 4RR corresponding to the wheel for which the compensation $\Delta H$ value is positive. Then, the flag for the vehicle height feedback during the roll is set at step 460, and the valves are actuated at step 465 according to the duty ratio D computed at step 455. The procedures at steps 445 through 465 are repeatedly executed until the absolute value of the compensation $\Delta H$ is less than the predetermined value $\Delta Ho$. As a result, the average vehicle height $\overline{H}$ gets close to the target displacement Hm.

Figure 7A:
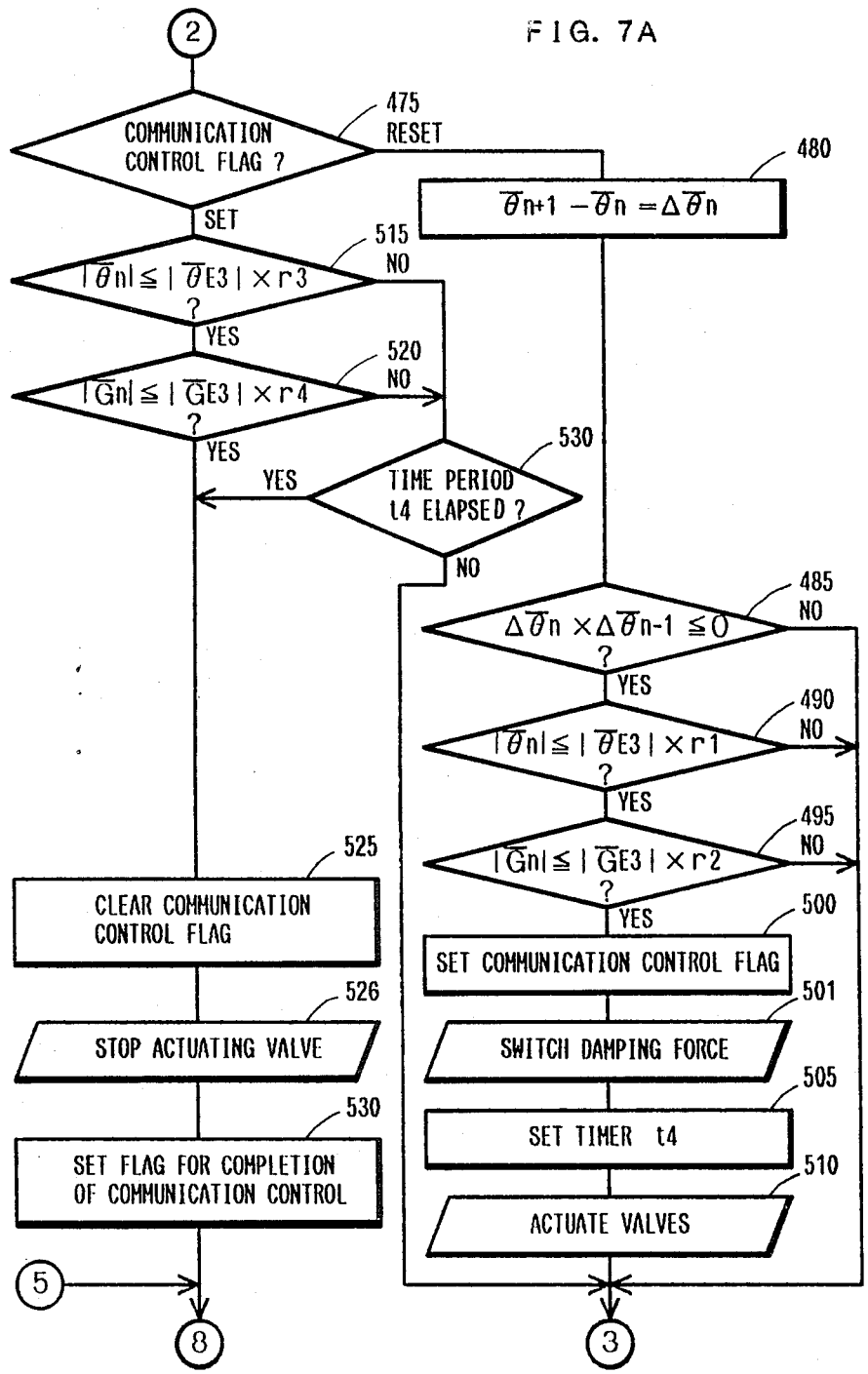

If it is determined at step 450 that the absolute value of the compensation $\Delta H$ is less than the predetermined value $\Delta Ho$, it means that the vehicle height feedback control during the roll has been completed, and thus, the flag for the vehicle height feedback control during the roll is cleared at step 470. Then, as shown in FIG. 7A, it is determined at step 475 whether the communication control flag, which will be described later, is being set or reset. If it is being reset, an average steering angle difference $\Delta \bar{\theta}n$ is computed at step 480 by subtracting the previous average steering angle $\bar{\theta}n$ from the updated average steering angle $\bar{\theta}n+1$. If it is determined at the subsequent step 485 that a product of the updated average steering angle difference $\Delta \bar{\theta}n$ and the previous average steering angle difference $\Delta \bar{\theta}n-1$ ($=\bar{\theta}n-\bar{\theta}n-1$) is equal to or less than zero, it means that the vehicle state has passed the inflection point E3, shown in FIG. 9B, as a result of the reverse steering of the steering wheel 88 during cornering. Then, it is determined at step 490 whether or not the absolute value of the updated average steering angle $\bar{\theta}n$ after the inflection point E3 is equal to or less than a particular rate r1, e.g., 70%, of the absolute value of the average steering angle $\theta E3$ at the inflection point E3. At the following step 495 it is determined whether or not the absolute value of the updated average lateral acceleration $\overline{G}n$ is equal to or less than a particular rate r2, e.g., 85%, of the absolute value of the average lateral acceleration $\overline{G}E3$ at the inflection point E3. When the answers at steps 490 and 495 are both YES, the communication control flag is set at step 500. Then, at step 501, the damping force of the shock absorbers 3FL, 3FR, 3RL and 3RR, which has been previously switched to a higher degree at step 218, is switched to the previous degree. Thereafter, a predetermined timer t4, e.g., a timer of 150 msec, is set at step 505, and actuation is made at step 510 on the leveling valves 42, 44, 46 and 48 so as to communicate the right main air chambers 4FR and 4RR with the left main air chambers 4FL and 4RL.

If it is determined at step 475 that the communication control flag is being set as a result of the repetition of the present control routine including the actuation of the leveling valves 42, 44, 46 and 48, the program proceeds to step 515 where it is determined whether the absolute value of the updated average steering angle $\bar{\theta}n$ after the inflection point E3 is equal to or less than a particular rate r3, e.g., 20% of the absolute value of the average steering angle $\theta E3$ at the inflection point E3. At the subsequent step 520 it is determined whether the absolute value of the updated average lateral acceleration $\overline{G}n$ is equal to or less than a particular rate r4, e.g., 20%, of the absolute value of the average lateral acceleration $\overline{G}E3$ at the inflection point E3. If the answers at steps 515 and 520 are both YES, it means that the communication control for the right and left main air chambers 4FL, 4FR, 4RL and 4RR has been completed, and the communication control flag is cleared at step 525.

On the other hand, if the answer at step 515 or step 520 is NO, the leveling valves 42, 44, 46 and 48 are actuated until it is determined at step 530 that the determined time period t4 which has been set at step 505 has elapsed. After the time period t4, the communication control flag is cleared at step 525. Subsequently, the actuation is stopped at step 526 on the leveling valves 42, 44, 46 and 48 to interrupt the communication, and the flag for the completion of the communication control is set at step 530.

Figure 7B:
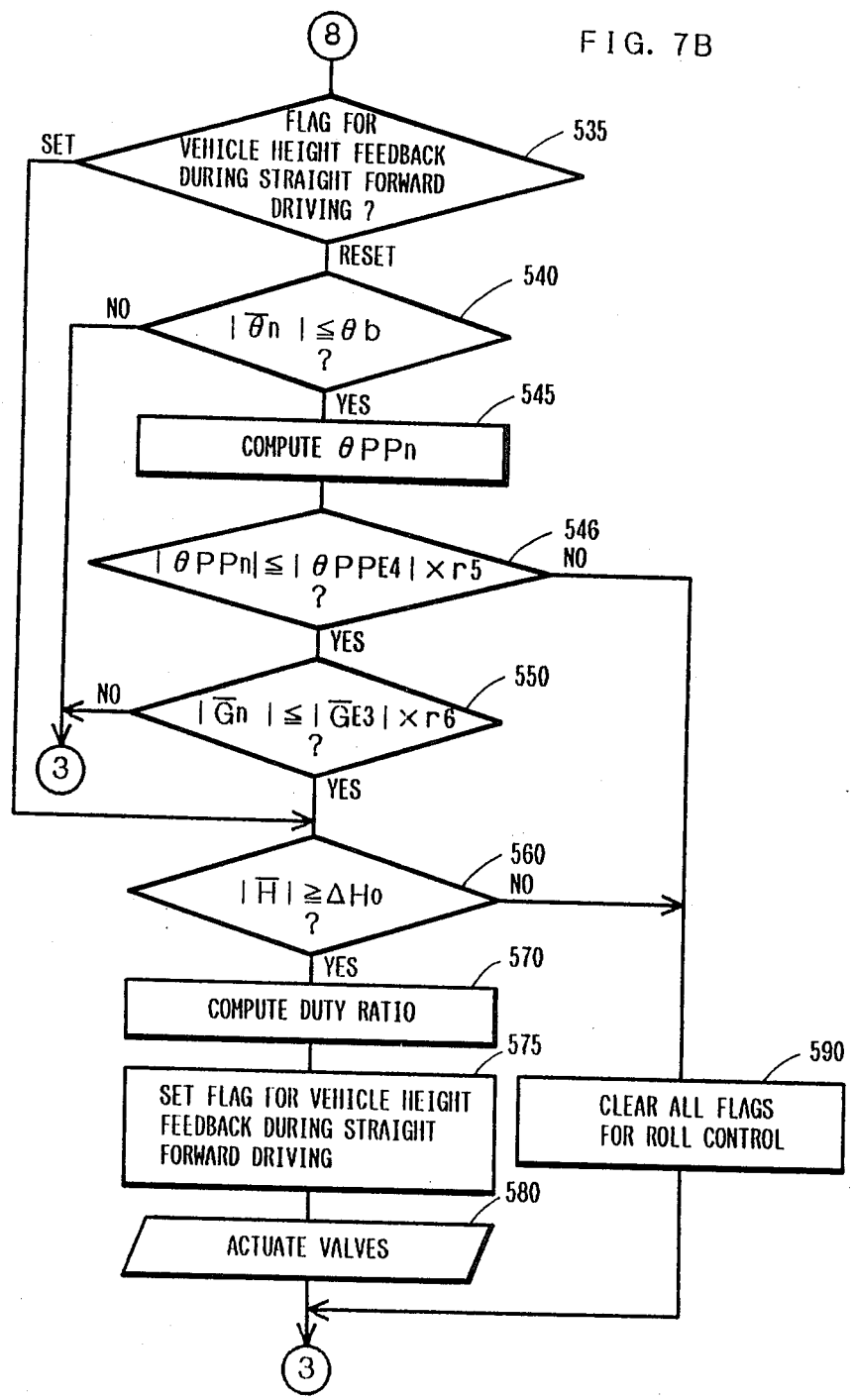

Thereafter, at step 535 in FIG. 7B it is determined whether a flag for the vehicle height feedback during the straight forward driving is being set or reset, and at step 540 it is determined whether the absolute value of the updated average steering angle $\bar{\theta}n$ is equal to or less than a predetermined angle $\theta b$, e.g., 20 degree. If it is determined at step 535 that the aforementioned flag is being reset and the answer at step 540 is YES, the steering angle difference $\theta PPn$ is computed at the following step 545 in the same manner as step 350. Subsequently, it is determined at step 546 whether the absolute value of the steering angle difference $\theta PPn$ is equal to or less than a particular rate r5, e.g., 40%, of the absolute value of the steering angle difference $\theta PPE4$ at the inflection point E4 shown in FIG. 9A. Specifically, the inflection point E4 indicates the time point when it is determined at step 490 that the absolute value of the average steering angle $\bar{\theta}n$ after the inflection point E3 is equal to or less than the predetermined rate r1 of the absolute value of the steering angle $\theta E3$ at the inflection point E3. At step 550 it is determined whether or not the absolute value of the updated average lateral acceleration $\overline{G}n$ is equal to or less than a particular rate r6, e.g., 50%, of the absolute value of the average lateral acceleration $\overline{G}E3$ at the inflection point E3. Furthermore, at step 560 it is determined whether or not the absolute value of the average vehicle height $\overline{H}$ is equal to or greater than the predetermined value $\Delta Ho$. If the answers at steps 546, 550 and 560 are YES, the valve actuation duty ratio D is computed at step 570 in order to equalize the average vehicle height $\overline{H}$ to the target displacement Hm which is now equal to zero during the straight forward driving. More particularly, a valve actuation duty ratio D is computed corresponding to the average vehicle height $\overline{H}$ (=compensation $\Delta H$) in accordance with FIG. 17 so as to actuate the high pressure reservoir valves 26 and 30 and the leveling valves 42, 44, 46 and 48 for supplying the compressed air from the high pressure reserve tanks 28 and 32 into one of the main air chambers 4FL, 4FR, 4RL and 4RR corresponding to the wheel for which the average vehicle height $\overline{H}$ value is negative. Alternatively, a valve actuation duty ratio D is computed corresponding to the average vehicle height $\overline{H}$ (=compensation $\Delta H$) in accordance with FIG. 17 so as to actuate the discharge valves 58, 60, 64 and 66 for releasing the air to the low pressure reserve tanks 62 and 68 from one of the main air chambers 4FL, 4FR, 4RL and 4RR corresponding to the wheel for which the average vehicle height $\overline{H}$ value is positive. After step 570, the flag for the vehicle height feedback during the straight forward driving is set at step 575, and the valves are actuated at step 580 according to the duty ratio D computed at step 570.

On the other hand, if it is determined at step 546 that the absolute value of the updated steering angle difference $\theta PPn$ is greater than the predetermined rate r5 of the absolute value of the steering angle difference $\theta PPE4$, it means that the vehicle is slaloming, and the program proceeds to step 590 without executing the valve actuation control during the straight forward driving (steps 550 through 580). Alternatively, if it is determined at step 560 that the absolute value of the average vehicle height $\overline{H}$ is less than the predetermined value $\Delta Ho$ as a result of the valve actuation control and repeated execution of the present control routine, it means that the vehicle attitude has become substantially horizontal; that is, the roll control has been completed, and the program also proceeds to step 590 where all the flags of the roll control are cleared.

Figure 8:
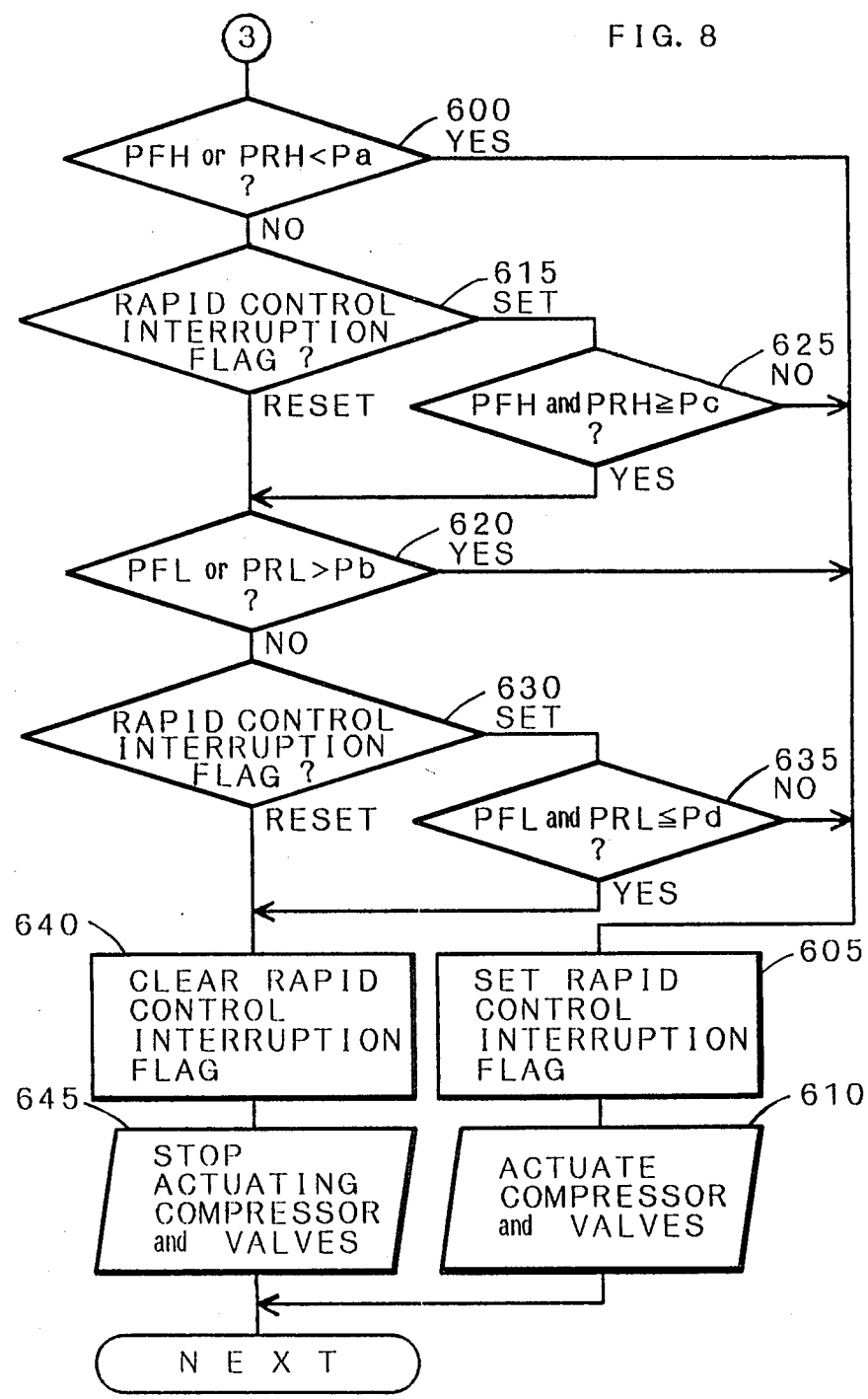

At step 600 shown in FIG. 8, it is determined whether the pressure PFH in the high pressure reserve tank 28 detected by the pressure sensor 34 or the pressure PRH in the high pressure reserve tank 32 detected by the pressure sensor 36 is less than a predetermined high interrupting pressure Pa, e.g., 9.5 atmosphere (absolute pressure)—that is, the pressure unsuitable for the aforementioned rapid attitude control—as a result of the above—described control for consuming the compressed air in the high pressure reserve tank 28 or 32. If the answer at step 600 is YES, the rapid control interruption flag is set at step 605. Then, actuation is made at step 610 on: the compressor 10 by means of the compressor motor 9 and actuates; the supply valve 22; one of the leveling valves 42, 44, 46 and 48; the suction valve 76, etc. As a result, one of the main air chambers 4FL, 4FR, 4RL and 4RR is supplied with the air from the low pressure reserve tanks 62 and 68, or with the compressed atmosphere via the check valve 78 in case that the pressure in the low pressure reserve tanks 62 and 68 is lower than the atmospheric pressure.

On the other hand, if it is determined at step 600 that the pressure PFH or PRH is not less than the high pressure interruption pressure Pa and determined at step 615 that the rapid control interruption flag is not being set, then the program proceeds to step 620. At step 620 it is determined whether the pressure PFL in the low pressure reserve tank 62 detected by the pressure sensor 70 or the pressure PRL in the low pressure reserve tank 68 detected by the pressure sensor 72 exceeds a predetermined low interrupting pressure Pb, e.g., 6 atmosphere (absolute pressure); that is, the pressure unsuitable for the aforementioned rapid attitude control. If the answer at step 620 is YES, the program proceeds to the above-described steps 605 and 610.

Alternatively, if it is determined at step 615 that the rapid control interruption flag is being set, that is, if the compressor 10 and the valves are being actuated, the compressor 10 and the valves are repeatedly actuated at step 610 until it is determined at step 625 that the pressure PFH in the high pressure reserve tank 28 and the pressure PRH in the high pressure reserve tank 32 are equal to or greater than a particular pressure Pc, e.g., 11 atmosphere (absolute pressure), which is predetermined as exceeding the high interrupting pressure Pa so as to sufficiently execute the rapid attitude control. If the pressures PFH and PRH exceed this pressure Pc, the program proceeds to step 620.

If it is determined at step 620 that either of the pressures PFL and PRL does not exceed the low interrupting pressure Pb, and further if it is determined at step 630 that the rapid control interruption flag is being set, it is determined at step 635 whether the pressure PFL in the low pressure reserve tank 62 and the pressure PRL in the low pressure reserve tank 68 are less than a particular pressure Pd, e.g., 5 atmosphere (absolute pressure), which is predetermined as being less than the low interrupting pressure Pb so as to sufficiently execute the rapid attitude control. If the pressures PFL and PRL exceed this predetermined pressure Pd, the program proceeds to steps 605 and 610. On the other hand, if it is determined at step 635 that the pressures PFL and PRL are less than the predetermined pressure Pd, it means that the rapid attitude control can be executed because the pressures PFH and PRH in the high pressure reserve tanks 28 and 32 are equal to or greater than the predetermined pressure Pc and the pressures PFL and PRL in the low pressure reserve tanks 62 and 68 are equal to or less than the predetermined pressure Pd as a result of the processing procedures at steps 605 and 610. Thus, at the subsequent step 640 the rapid control interruption flag is cleared, and at step 645 the actuation is stopped on: the compressor 10 by means of the compressor motor 9; the supply valve 22; the leveling valves 42, 44, 46 and 48; the suction valve 76; and so forth. Alternatively, if it is determined at step 630 that the rapid control interruption flag is being reset, the aforementioned steps 640 and 645 are also executed. After step 610 or 645, the program proceeds to "NEXT".

In the first embodiment, step 250 functions as the steering angle difference detection means M7 in FIG. 1; step 265 functions as the estimated acceleration calculation means M8; and steps 270 through 285, 295 and 315 function as the supply/release control means M9.

According to the electronic controlled suspension system of the embodiment described hereinbefore, the steering angle difference $\theta PPo$ is calculated (step 250) in response to the detection of the operation of the steering wheel 88 at step 245. Then, a predetermined estimated lateral acceleration $\alpha$ is calculated (step 265) based on the steering angle difference $\theta PPo$ and the vehicle speed V, and then, based on this estimated lateral acceleration $\alpha$, the vehicle height compensation C is calculated (step 275). Subsequently, the variable pressure $\Delta PFH$, $\Delta PRH$, $\Delta PFL$, and $\Delta PRL$ are calculated (step 280) based on the vehicle height compensation C, and the valve actuating time periods TCF, TCR TDF and TDR are calculated (step 285). According to these valve actuating time periods TCF, TCR, TDF and TDR, actuation is made (steps 295 and 315) on: the high pressure reservoir valves 26 and 30; the leveling valves 42, 44, 46 and 48; and the discharge valves 58, 60, 64 and 66.

Therefore, the electronic controlled suspension system of the present embodiment prevents the roll of the vehicle in the following manner. Before the vehicle body begins to tilt due to the lateral acceleration Ga, the estimated lateral acceleration $\alpha$ is calculated. Corresponding to this estimated lateral acceleration $\alpha$, the compressed air is rapidly supplied from the high pressure reserve tanks 28 and 32 into the main air chambers 4FL and 4RL (or the main air chambers 4FR and 4RR) at the outer-wheel side, and simultaneously the air is rapidly released from the main air chambers 4FR and 4RR (or the main air chambers 4FL and 4RL) at the inner-wheel side into the low pressure reserve tanks 62 and 68. Moreover, according to the present embodiment, the calculation of the steering angle difference $\alpha PPo$ makes it possible to appropriately control either sudden operation or slow operation on the steering wheel 88, thereby avoiding late control without necessitating a frequent operation of the system. Furthermore, the steering angle difference $\theta PPo$ can be calculated by means of a small number of maps so that the signals can be processed more promptly and the capacity of the CPU can be reduced.

Figure 18:
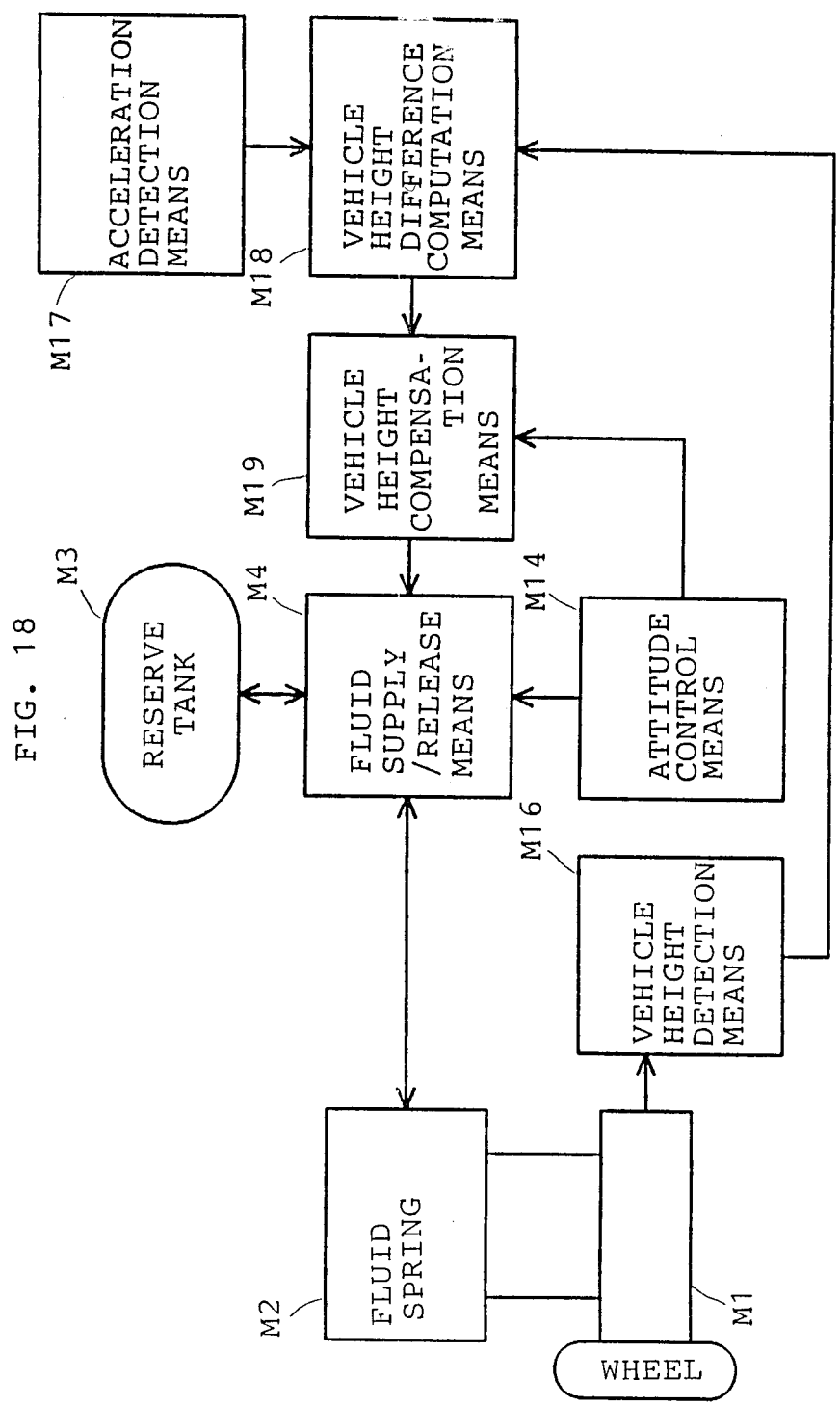
FIG. 18 is a block diagram showing a fundamental structure of a second embodiment of the present invention.

Hereinafter, a second embodiment of the present invention will be explained with reference to the drawings. The second embodiment has the same construction as the first embodiment shown in FIGS. 2, 3 and 4. It is distinguished from the first embodiment by the structure illustrated by the block diagram in FIG. 18 wherein: the vehicle height detection means M16 corresponds to the vehicle height sensors 80, 82, 84 and 86; and the acceleration detection means M17 corresponds to the acceleration sensor 92.

Figure 5A:
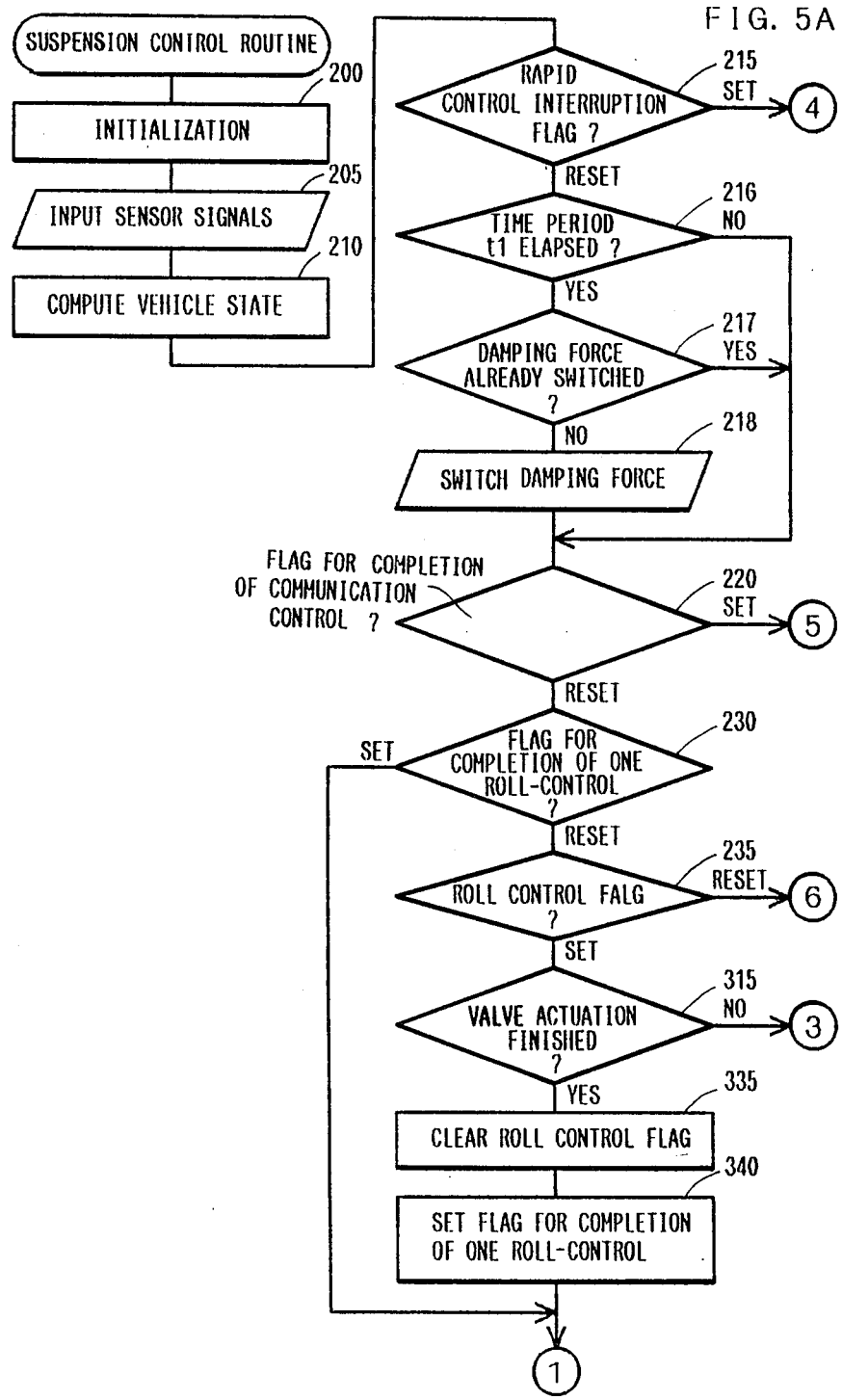
FIGS. 5A, 5B, 6A, 6B, 7A, 7B and 8 indicate a flowchart of a suspension control routine of the first embodiment.
Figure 5B:
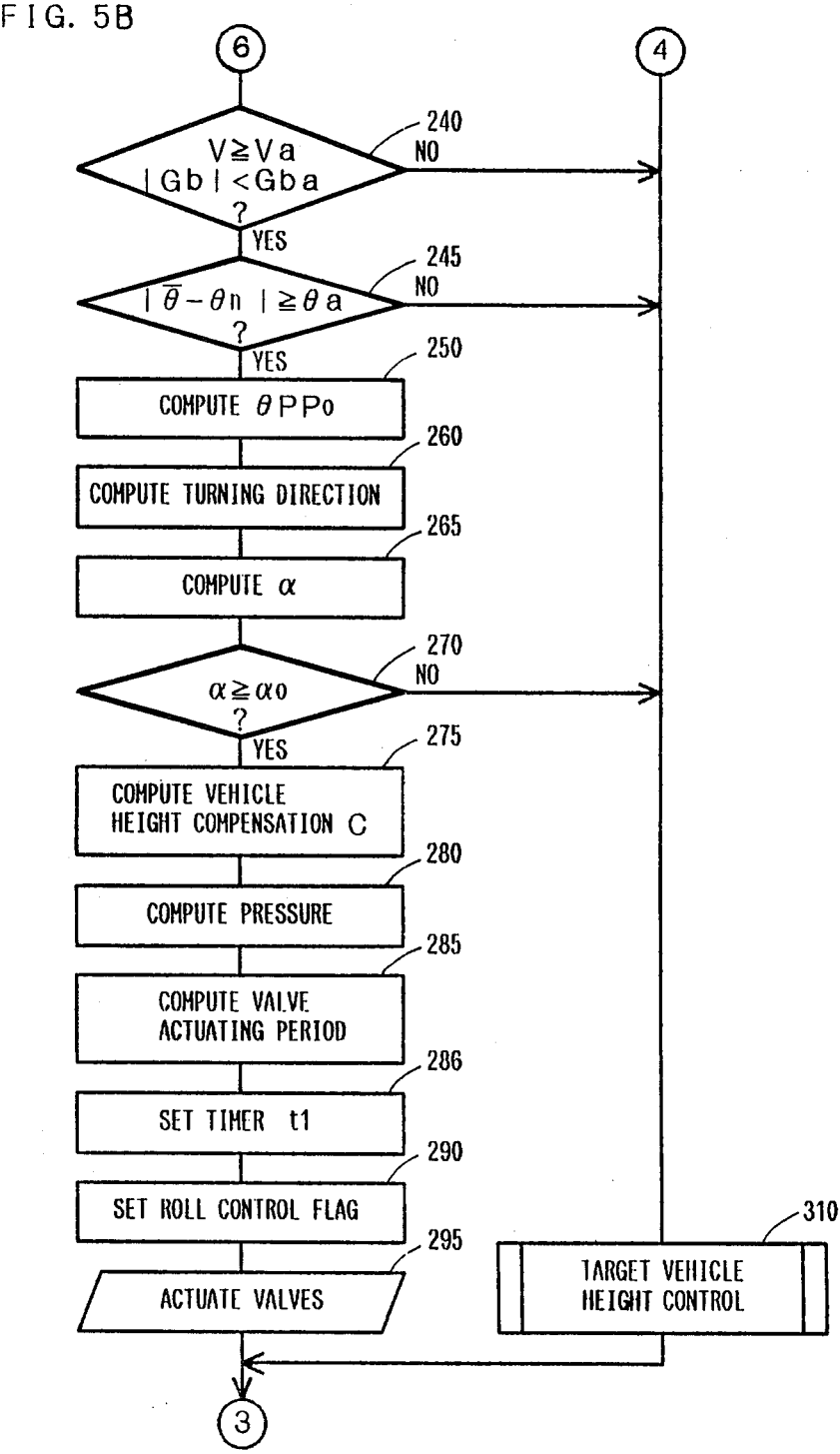
Figure 19:
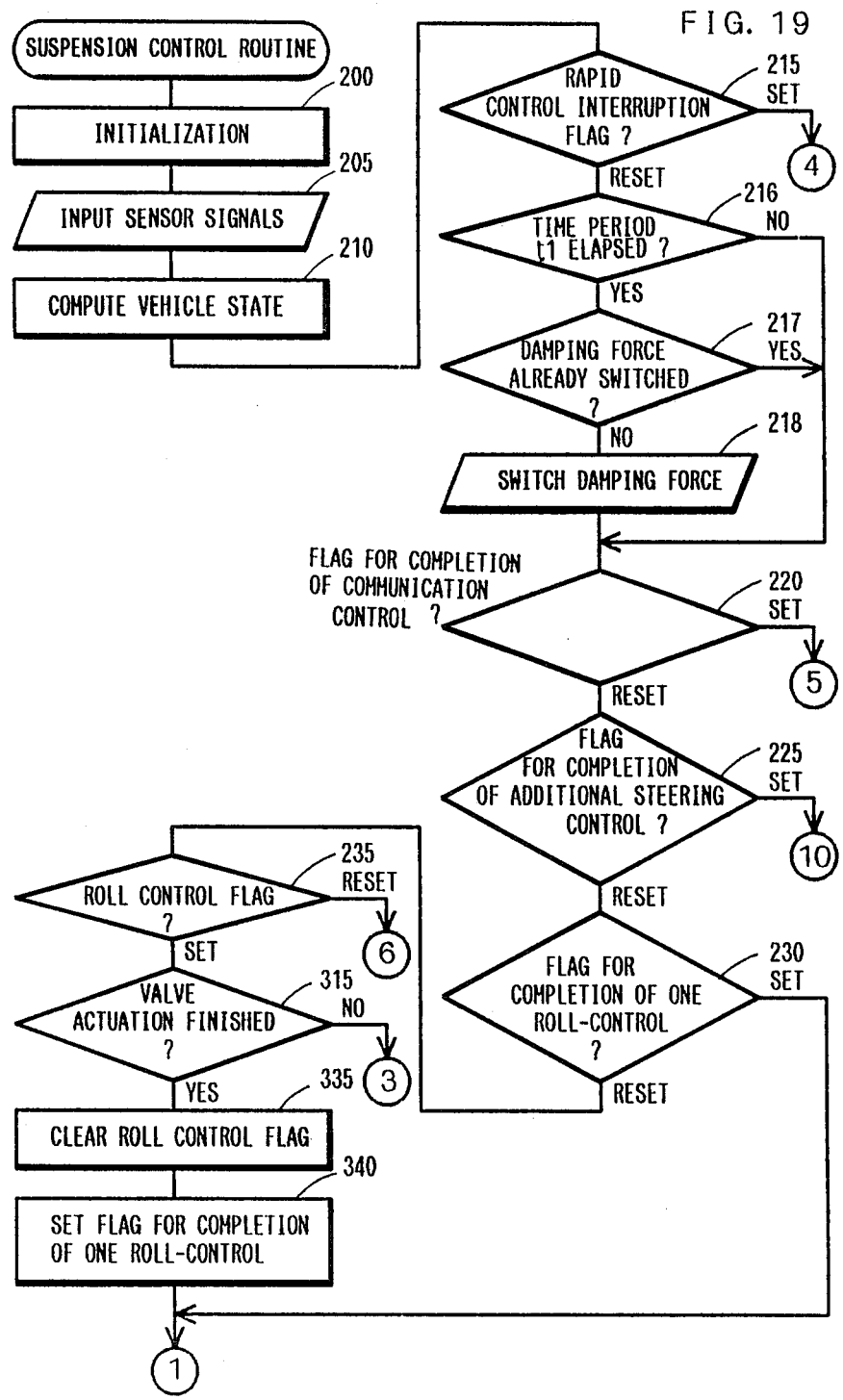
FIG. 19 and 20 indicate a flowchart of a suspension control routine of the second embodiment.
Figure 20:
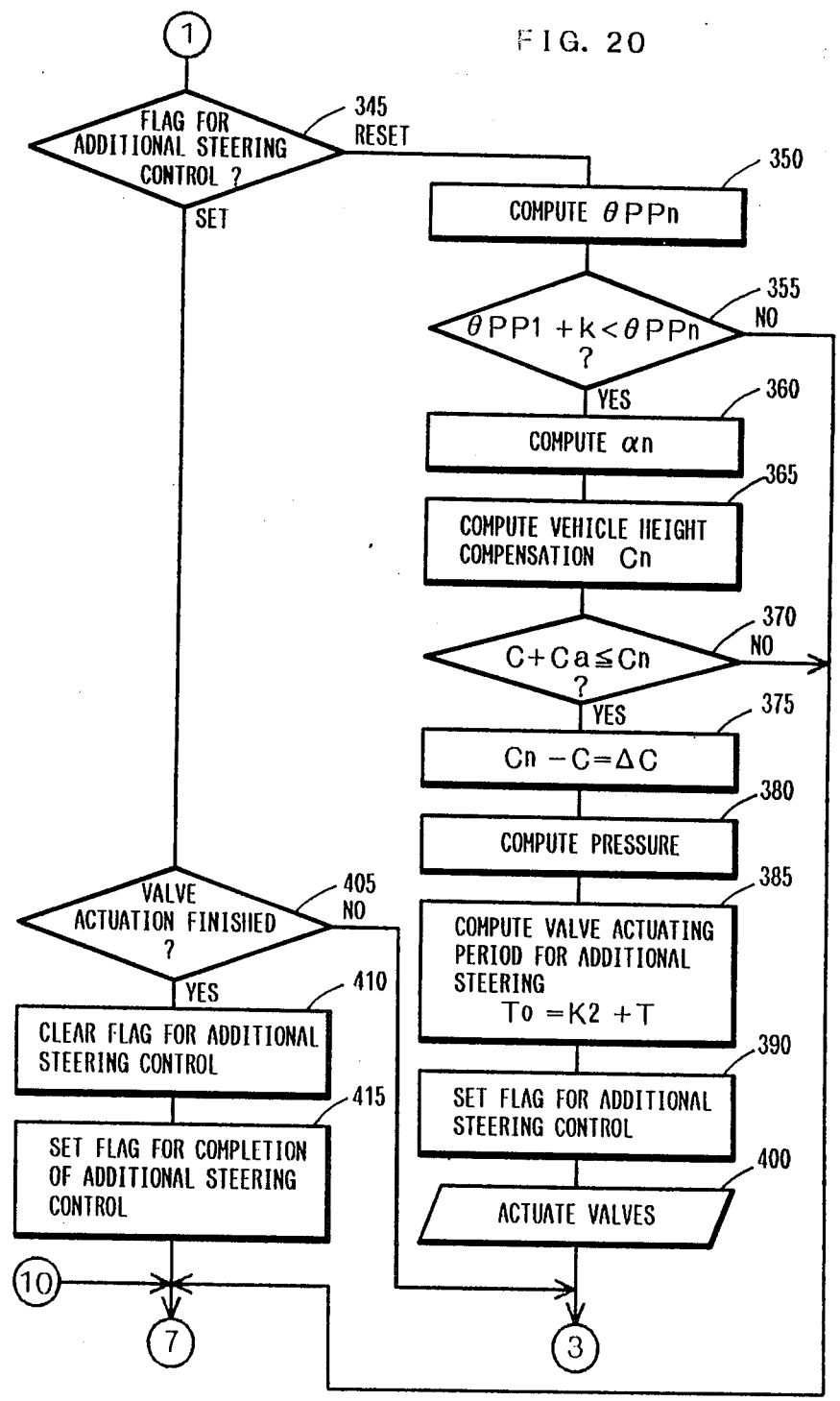

The control routine of the second embodiment will be described with reference to the flowcharts in FIGS. 19 and 20, which substitute for FIGS. 5A and 6A, respectively, of the first embodiment. Between the determination steps 220 and 230 explained in the first embodiment, the second embodiment provides the control routine with another determination step 225. Specifically, at step 225 it is determined whether a flag for the completion of the additional steering control—described later—is being set or reset. If it is determined at step 225 that this flag is being reset, the program goes through the similar steps to the first embodiment as far as step 410. After the flag for the additional steering control is cleared at step 410, the routine in the first embodiment proceeds to step 420 in FIG. 6B. On the other hand, the routine in the second embodiment proceeds to step 415 for setting the flag for the completion of the additional steering control, indicating that the additional steering control has been completed. After the flag for the completion of the additional steering control is set at 415, the program proceeds to step 420 shown in FIG. 6B and the subsequent steps similarly to the first embodiment. If it is determined at the aforementioned step 225 in FIG. 19 that the flag for the completion of the additional steering control is being set as a result of the repeated execution of the present control routine, the program also proceeds to step 420 in FIG. 6B by skipping steps 230 through 415.

In the above-described second embodiment, steps 240 through 295, and step 315 function as the attitude control means M14; steps 440 and 450 function as the vehicle height difference computation means M18; and steps 425, 430, 445 and 455 through 465 function as the vehicle height compensation means M19.

As described above, the electronic controlled suspension system of the second embodiment can prevent the vehicle from rolling by supplying and releasing the air to and from the main air chambers 4FL, 4FR, 4RL and 4RR based on the estimated lateral acceleration $\alpha$ (steps 240-295, 315). Furthermore, the target displacement Hm is calculated based on the lateral acceleration Ga (step 440) after the vehicle state passes the inflection point E1 or E2, namely, the point when the lateral acceleration Gan stops increasing (step 430); or after the valves are actuated (steps 295, 400) and the predetermined time period t2 or t3 passes. Then, the vehicle height difference $\Delta H$ is calculated as the difference between the target displacement Hm and the average vehicle height H (step 450). Based on this vehicle height difference ΔH, the valves: namely, the high pressure reservoir valves 26 and 30; the leveling valves 42, 44, 46 and 48; and the discharge valves 58, 60, 64 and 66 are controlled according to the computed duty ratio.

Therefore, the electronic controlled suspension system of the second embodiment keeps the average vehicle height $\overline{H}$ at the predetermined target displacement Hm by compensating for a change in the vehicle height during the cornering, even when the actual lateral acceleration Ga becomes different from the estimated lateral acceleration α because of the external disturbance such as a different frictional coefficient on an uneven road surface or a cross wind. Thus, the riding comfort and the steering stability can be enhanced especially during cornering.

Still furthermore, the anti roll control as the rapid control according to the present invention may be carried out in the following manner. Under the condition that: a current vehicle speed V is equal to or greater than a predetermined speed Vb, e.g., 15 km/h; and an absolute value of a current average front-to-rear acceleration G is less than a predetermined acceleration Gb, e.g., 0.3 g, it is determined that the anti roll control is required. If the steering wheel 88 is subsequently operated, a predetermined estimated lateral acceleration αa is calculated based on the difference θPP between a maximum steering angle θMAX and a minimum steering angle θMIN detected by the steering angle sensor 90 within a particular time period. A vehicle height compensation C is calculated based on this estimated lateral acceleration αa, so as to adjust the vehicle height. After the vehicle's attitude is controlled in this manner, the maximum acceleration, i.e., the maximum lateral acceleration is detected. If the lateral acceleration is lowered to become equal to or less than a particular rate, e.g., 70%, of the maximum acceleration, the leveling valves 42, 44, 46 and 48 are actuates so as to communicate the left main air chambers 4FL and 4RL with the right main air chambers 4FR and 4RR for restoring the vehicle's attitude. Therefore, if the lateral acceleration is further lowered to become equal to or less than a particular rate, e.g., 30%, of the maximum acceleration, a valve actuation duty ratio is calculated based on the calculated average vehicle height $\overline{H}$ (=compensation ΔH), and then the valves are actuated according to this duty ratio. As described above, the anti roll control of the present embodiment can adjust the vehicle's height to the target vehicle height.

Figure 21:
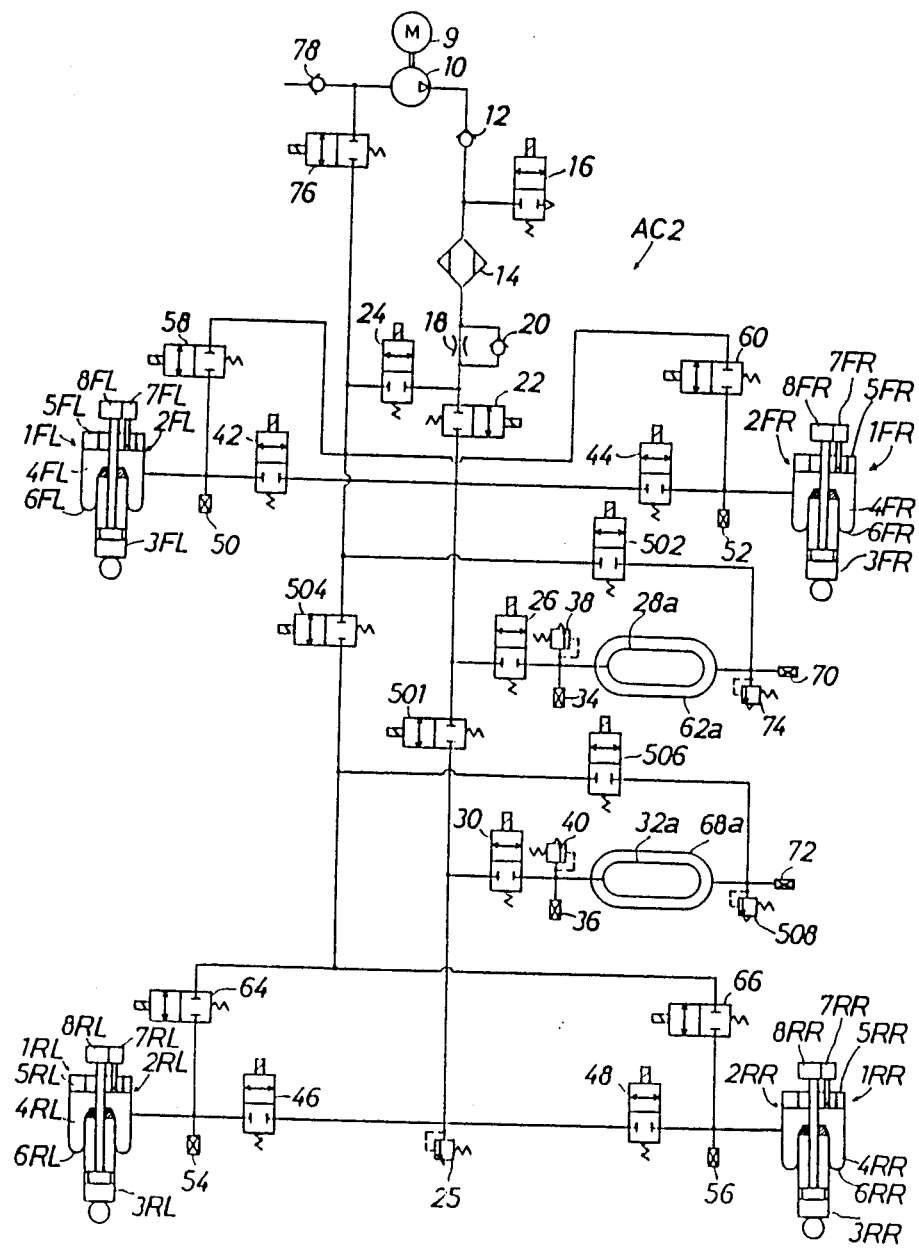
FIG. 21 is an air circuit diagram showing another embodiment of the present invention.

Set forth is the explanation of another embodiment different from that of FIG. 3 with reference to FIG. 21. In this air circuit AC2, the same components as those of the air circuit AC are designated by the same reference numerals.

In the air circuit AC2, a high pressure reserve tank 28a and a low pressure reserve tank 62a at the front wheel side as well as a high pressure reserve tank 32a and a low pressure reserve tank 68a at the rear wheel side are made integral. One side of the high pressure reservoir valve 26 connected to the front-wheel side high pressure reserve tank 28a and the high pressure reservoir valve 30 connected to the high pressure reserve tank 32a are connected to each other through a communication valve 501 for establishing and blocking the communication. As a result, even if the two high pressure reservoir valves 26 and 30 are simultaneously energized, no communication is established between the two high pressure reserve tanks 28a and 32a unless the communication valve 501 is energized.

Moreover, the front-wheel side low pressure reserve tank 62a is connected to one side of a low pressure reservoir valve 502 for establishing and blocking the communication, and the other side of the valve 502 is connected to the suction valve 76 and the front-wheel side two discharge valves 58 and 60 and to one side of a communication valve 504 for establishing and blocking the communication. The other side of this communication valve 504 is connected to the low pressure reserve tank 68a through a low pressure reserve valve 506 for providing and blocking the communication and to the two rear-wheel side discharge valves 64 and 66. Furthermore, the low pressure reserve tank 68a is connected to a relief valve 508 which is set to operate at a predetermined pressure. As a result, the low pressure reserve tanks 62a have their communications blocked from other valves by the low pressure reservoir valves 502 and 506 so that they do not communicate with each other until the communication valve 504 is energized, even if the two low pressure reservoir valves 502 and 506 are energized.

This air circuit AC2 allows the main air chambers 4FL and 4FR and the low pressure reserve tank 62a to communicate with each other by energizing the low pressure reservoir valve 502 and the discharge valves 58 and 60 at the front wheel side. Moreover, the main air chambers 4RL and 4RR and the low pressure reserve tank 68a are enabled to communicate by energizing the low pressure reservoir valve 506 and the discharge valves 64 and 66 at the rear wheel side.

According to the aforementioned air circuit AC2, the two high pressure reserve tanks 28a and 32a and the two low pressure reserve tanks 62a and 68a are provided with the respective valves: namely, the high pressure reserve tank 28a is connected with the high pressure reservoir valve 26 and the communication valve 501; the other high pressure reserve tank 32a is connected with the high pressure reservoir valve 30 and the communication valve 501; the low pressure reserve tank 62a is connected with the low pressure reservoir valve 502 and the communication valve 504; and the other low pressure reserve tank 68a is connected with the low pressure reservoir valve 506 and the communication valve 504. As a result, the pressure in those reserve tanks 28a, 32a, 62a and 68a can be individually controlled.

Despite of the embodiments thus far described, the present invention should not be limited thereto but can naturally be practiced in various modes without departing from its scope.

What is claimed is:

1. A fluid suspension system comprising:
   a fluid suspension having a fluid spring;
   fluid supply/release connected to the fluid spring for supplying and releasing fluid to and from the liquid spring;
   steering angle detection means for detecting a steering angle;
   vehicle speed detection means for detecting a vehicle speed;
   steering angle difference detection means for computing a steering angle difference between a maximum steering angle and a minimum steering angle detected within a predetermined time period;
   estimated acceleration calculation means for computing an estimated lateral acceleration in response to the detected steering angle difference and the detected vehicle speed; and supply/release control means for computing a controlled variable for the fluid supply/release means in response to the estimated lateral acceleration and for controlling the fluid supply/release means in response to the controlled variable so as to control a vehicle attitude.

2. A fluid suspension system according to claim 1 wherein the fluid suspension includes a high pressure reserve tank and a low pressure reserve tank, and the fluid supply/release means include means for supplying the fluid from the high pressure reserve tank to the fluid spring and for releasing the fluid from the fluid spring to the low pressure reserve tank.

3. A fluid suspension system according to claim 2 wherein the supply/release control means include means for computing a first variable pressure of the high reserve tank and a second variable pressure of the low reserve tank in response to the controlled variable.

4. A fluid suspension system according to claim 3 wherein the supply/release control means include means for generating valve actuation signals to actuate valves of the fluid supply/release means so as to operate the fluid spring in response to the variable pressure of the high reserve tank and the variable pressure of the low reserve tank.

5. A fluid suspension system according to claim 1 further comprising vehicle turning detection means: for computing an average steering angle based on the steering angles detected within a predetermined time period; and for comparing the difference between the average steering angle and a steering angle detected after steering operation with a predetermined steering angle, so as to stop the computation of the steering angle difference between the maximum steering angle and the minimum steering angle.

6. A fluid suspension system according to claim 1 wherein the supply/release control means include means for determining whether or not the estimated lateral acceleration is greater than a predetermined lateral acceleration so as to stop the computation of the controlled variable for the fluid supply/release means.

7. A fluid suspension system according to claim 1 further comprising:

vehicle attitude restoration means for making communication between right and left fluid springs;

lateral acceleration detection means for detecting a lateral acceleration;

vehicle height detection means for detecting a vehicle height; and correction means responsive to the vehicle attitude restoration means for computing a controlled variable in response to the vehicle height detected by the vehicle height detection means and to a target vehicle height, and for controlling the supply/release means in response to the controlled variable so as to adjust the vehicle height to the target vehicle height, when the lateral acceleration becomes equal to or less than a predetermined lateral acceleration.

8. A fluid suspension system comprising:

a fluid suspension having a fluid spring;

fluid supply/release means connected to the fluid spring for supplying and releasing fluid to and from the fluid spring;

steering angle detection means for detecting a steering angle of the vehicle;

vehicle attitude control means for controlling the fluid supply/release means in response to the detected steering angle;

vehicle height detection means for detecting a vehicle height;

lateral acceleration detection means for detecting a lateral acceleration of the vehicle;

vehicle height difference computation means for computing a target vehicle height in response to the detected lateral acceleration, and for computing a vehicle height difference between the target vehicle height and the detected vehicle height; and vehicle height compensation means for controlling the fluid supply/release means in response to the computed vehicle height difference when the lateral acceleration stops increasing after the fluid supply/release means is controlled by the vehicle attitude control means, thereby controlling the vehicle height and preventing the vehicle from rolling.

9. A fluid suspension system according to claim 8 wherein the fluid suspension includes a high pressure reserve tank and a low pressure reserve tank, and the fluid supply/release means include means for supplying the fluid from the high pressure reserve tank to the fluid spring and for releasing the fluid from the fluid spring to the low pressure reserve tank.

10. A fluid suspension according to claim 8 wherein the vehicle height compensation means include means for determining that the lateral acceleration stops increasing based on a difference between a previously detected lateral acceleration and a presently detected lateral acceleration.

11. A fluid suspension system according to claim 8 wherein the vehicle height compensation means include means for computing a duty ratio in response to the computed vehicle height difference so as to actuate valves of the fluid supply/release means.

* * * * *